US010101024B2

(12) United States Patent
Goodson et al.

(10) Patent No.: US 10,101,024 B2
(45) Date of Patent: *Oct. 16, 2018

(54) METHOD FOR COMBUSTION OF MULTIPLE FUELS

(71) Applicant: CLEARSIGN COMBUSTION CORPORATION, Seattle, WA (US)

(72) Inventors: David B. Goodson, Bellevue, WA (US); Tracy A. Prevo, Seattle, WA (US); Joseph Colannino, Bellevue, WA (US); Robert E. Breidenthal, Seattle, WA (US); Igor A. Krichtafovitch, Kirkland, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,062

(22) Filed: May 25, 2017

(65) Prior Publication Data

US 2017/0261201 A1 Sep. 14, 2017

Related U.S. Application Data

(60) Division of application No. 15/050,177, filed on Feb. 22, 2016, now Pat. No. 9,696,031, which is a
(Continued)

(51) Int. Cl.
*F23C 99/00* (2006.01)
*B01D 46/00* (2006.01)
(Continued)

(52) U.S. Cl.
CPC ........ *F23C 99/001* (2013.01); *B01D 46/0032* (2013.01); *B01D 53/323* (2013.01);
(Continued)

(58) Field of Classification Search
CPC .......... F23C 6/047; F23C 13/00–13/08; F23C 2201/301; F23C 9/00; F23C 99/001;
(Continued)

(56) References Cited

U.S. PATENT DOCUMENTS 2,604,936 A 7/1952 Kaehni et al.
3,004,137 A 10/1961 Karlovitz
(Continued)

FOREIGN PATENT DOCUMENTS

EP 0844434 5/1998
EP 1139020 8/2006
(Continued)

OTHER PUBLICATIONS

F. Altendorfner et al., Electric Field Effects on Emissions and Flame Stability with Optimized Electric Field Geometry, The European Combustion Meeting ECM 2007, 2007, Fig. 1, Germany.
(Continued)

*Primary Examiner* — David J Laux
(74) *Attorney, Agent, or Firm* — Christopher A. Wiklof; Nicholas S. Bromer; Launchpad IP, Inc.

(57) ABSTRACT

According to embodiments, a co-fired or multiple fuel combustion system is configured to apply an electric field to a combustion region corresponding to a second fuel that normally suffers from poor combustion and/or high sooting. Application of an AC voltage to the combustion region was found to increase the extent of combustion and significantly reduce soot evolved from the second fuel.

13 Claims, 14 Drawing Sheets

Related U.S. Application Data continuation-in-part of application No. 14/203,539, filed on Mar. 10, 2014, now Pat. No. 9,371,994, and a continuation-in-part of application No. 13/731,109, filed on Dec. 30, 2012, now Pat. No. 9,267,680.

(60) Provisional application No. 61/775,482, filed on Mar. 8, 2013, provisional application No. 61/616,223, filed on Mar. 27, 2012.

(51) Int. Cl.

| | | |
|---|---|---|
| *B01D 53/32* | (2006.01) | |
| *F23G 5/12* | (2006.01) | |
| *F23C 6/04* | (2006.01) | |
| *F01N 3/08* | (2006.01) | |
| *F23G 5/44* | (2006.01) | |
| *F23C 9/00* | (2006.01) | |
| *F23C 1/02* | (2006.01) | |
| *F23C 5/08* | (2006.01) | |

(52) U.S. Cl.
CPC ............ *F01N 3/0892* (2013.01); *F23C 6/047* (2013.01); *F23G 5/12* (2013.01); *F23G 5/442* (2013.01); *F01N 2240/04* (2013.01); *F23B 2900/00006* (2013.01); *F23C 1/02* (2013.01); *F23C 5/08* (2013.01); *F23C 9/00* (2013.01); *F23C 2201/301* (2013.01); *F23G 2204/103* (2013.01); *F23J 2217/102* (2013.01)

(58) Field of Classification Search
CPC ........ F23G 5/12; F23G 5/14; F23G 2204/103; F01N 3/0892; F01N 2240/04; B01D 46/0032; B01D 53/323; F23J 2217/102
See application file for complete search history.

(56) References Cited

U.S. PATENT DOCUMENTS

| | | | |
|---|---|---|---|
| 3,087,472 A | 4/1963 | Yukichi | |
| 3,167,109 A | 1/1965 | Wobig | |
| 3,224,485 A | 12/1965 | Blomgren, Sr. et al. | |
| 3,269,446 A | 8/1966 | Luther | |
| 3,306,338 A | 2/1967 | Wright et al. | |
| 3,358,731 A | 12/1967 | Donnelly | |
| 3,373,306 A | 3/1968 | Karlovitz | |
| 3,416,870 A | 12/1968 | Wright | |
| 3,669,041 A | 6/1972 | Schworer | |
| 3,749,545 A | 7/1973 | Velkoff | |
| 3,841,824 A | 10/1974 | Bethel | |
| 4,020,388 A | 4/1977 | Pratt, Jr. | |
| 4,091,779 A | 5/1978 | Sauflerer et al. | |
| 4,093,430 A | 6/1978 | Schwab et al. | |
| 4,111,636 A | 9/1978 | Goldberg | |
| 4,362,016 A | 12/1982 | Papadopulos | |
| 4,430,024 A | 2/1984 | Guild et al. | |
| 4,443,182 A | 4/1984 | Wojcieson et al. | |
| 4,675,029 A | 6/1987 | Norman et al. | |
| 5,288,303 A | 2/1994 | Woracek et al. | |
| 5,300,270 A | 4/1994 | Krigmont et al. | |
| 5,515,681 A | 5/1996 | DeFreitas | |
| 5,702,244 A | 12/1997 | Goodson et al. | |
| 5,784,889 A | 7/1998 | Joos et al. | |
| 6,211,490 B1 | 4/2001 | Nosse | |
| 7,137,808 B2 | 11/2006 | Branston et al. | |
| 7,243,496 B2 | 7/2007 | Pavlik et al. | |
| 7,837,962 B2 | 11/2010 | Eiteneer et al. | |
| 8,082,725 B2 | 12/2011 | Younsi et al. | |
| 8,245,951 B2 | 8/2012 | Fink et al. | |
| 8,851,882 B2 | 10/2014 | Hartwick et al. | |
| 8,881,535 B2 | 11/2014 | Hartwick et al. | |
| 8,911,699 B2 | 12/2014 | Colannino et al. | |
| 9,062,882 B2 | 6/2015 | Hangauer et al. | |
| 9,151,549 B2 | 10/2015 | Goodson et al. | |
| 9,209,654 B2 | 12/2015 | Colannino et al. | |
| 9,243,800 B2 | 1/2016 | Goodson et al. | |
| 9,284,886 B2 | 3/2016 | Breidenthal et al. | |
| 9,289,780 B2 | 3/2016 | Goodson | |
| 9,310,077 B2 | 4/2016 | Breidenthal et al. | |
| 9,366,427 B2 | 6/2016 | Sonnichsen et al. | |
| 9,371,994 B2 | 6/2016 | Goodson et al. | |
| 9,377,188 B2 | 6/2016 | Ruiz et al. | |
| 9,377,189 B2 | 6/2016 | Ruiz et al. | |
| 9,377,195 B2 | 6/2016 | Goodson et al. | |
| 9,441,834 B2 | 9/2016 | Colannino et al. | |
| 9,453,640 B2 | 9/2016 | Krichtafovitch et al. | |
| 9,469,819 B2 | 10/2016 | Wiklof | |
| 9,494,317 B2 | 11/2016 | Krichtafovitch et al. | |
| 9,496,688 B2 | 11/2016 | Krichtafovitch et al. | |
| 2005/0208442 A1 | 9/2005 | Heiligers et al. | |
| 2005/0208446 A1 | 9/2005 | Jayne | |
| 2006/0156791 A1 | 7/2006 | Tikkanen et al. | |
| 2006/0165555 A1 | 7/2006 | Spielman et al. | |
| 2007/0071657 A1 | 5/2007 | Okubo et al. | |
| 2011/0072786 A1 | 3/2011 | Tokuda et al. | |
| 2012/0156628 A1 | 6/2012 | Lochschmied et al. | |
| 2013/0071794 A1 | 3/2013 | Colannino et al. | |
| 2013/0230810 A1 | 9/2013 | Goodson et al. | |
| 2013/0260321 A1 | 10/2013 | Colannino et al. | |
| 2013/0291552 A1 | 11/2013 | Smith et al. | |
| 2013/0323661 A1 | 12/2013 | Goodson et al. | |
| 2013/0333279 A1 | 12/2013 | Osier et al. | |
| 2013/0336352 A1 | 12/2013 | Colannino et al. | |
| 2014/0051030 A1 | 2/2014 | Colannino et al. | |
| 2014/0065558 A1 | 3/2014 | Colannino et al. | |
| 2014/0076212 A1 | 3/2014 | Goodson et al. | |
| 2014/0080070 A1 | 3/2014 | Krichtafovitch et al. | |
| 2014/0162195 A1 | 6/2014 | Lee et al. | |
| 2014/0162197 A1 | 6/2014 | Krichtafovitch et al. | |
| 2014/0162198 A1 | 6/2014 | Krichtafovitch et al. | |
| 2014/0170569 A1 | 6/2014 | Anderson et al. | |
| 2014/0170571 A1 | 6/2014 | Casasanta, III et al. | |
| 2014/0170575 A1 | 6/2014 | Krichtafovitch | |
| 2014/0170576 A1 | 6/2014 | Colannino et al. | |
| 2014/0170577 A1 | 6/2014 | Colannino et al. | |
| 2014/0196368 A1 | 7/2014 | Wiklof | |
| 2014/0208758 A1 | 7/2014 | Breidenthal et al. | |
| 2014/0212820 A1 | 7/2014 | Colannino et al. | |
| 2014/0216401 A1 | 8/2014 | Colannino et al. | |
| 2014/0227645 A1 | 8/2014 | Krichtafovitch et al. | |
| 2014/0227646 A1 | 8/2014 | Krichtafovitch et al. | |
| 2014/0227649 A1 | 8/2014 | Krichtafovitch et al. | |
| 2014/0248566 A1 | 9/2014 | Krichtafovitch et al. | |
| 2014/0255855 A1 | 9/2014 | Krichtafovitch | |
| 2014/0255856 A1 | 9/2014 | Colannino et al. | |
| 2014/0272731 A1 | 9/2014 | Breidenthal et al. | |
| 2014/0287368 A1 | 9/2014 | Krichtafovitch et al. | |
| 2014/0295094 A1 | 10/2014 | Casasanta, III | |
| 2014/0295360 A1 | 10/2014 | Wiklof | |
| 2014/0335460 A1 | 11/2014 | Wiklof et al. | |
| 2015/0079524 A1 | 3/2015 | Colannino et al. | |
| 2015/0104748 A1 | 4/2015 | Dumas et al. | |
| 2015/0107260 A1 | 4/2015 | Colannino et al. | |
| 2015/0118629 A1 | 4/2015 | Colannino et al. | |
| 2015/0121890 A1 | 5/2015 | Colannino et al. | |
| 2015/0140498 A1 | 5/2015 | Colannino | |
| 2015/0147704 A1 | 5/2015 | Krichtafovitch et al. | |
| 2015/0147705 A1 | 5/2015 | Colannino et al. | |
| 2015/0147706 A1 | 5/2015 | Krichtafovitch et al. | |
| 2015/0219333 A1 | 8/2015 | Colannino et al. | |
| 2015/0226424 A1 | 8/2015 | Breidenthal et al. | |
| 2015/0276211 A1 | 10/2015 | Colannino et al. | |
| 2015/0338089 A1 | 11/2015 | Krichtafovitch et al. | |
| 2015/0345780 A1 | 12/2015 | Krichtafovitch | |
| 2015/0345781 A1 | 12/2015 | Krichtafovitch et al. | |
| 2015/0362177 A1 | 12/2015 | Krichtafovitch et al. | |
| 2015/0362178 A1 | 12/2015 | Karkow et al. | |
| 2015/0369476 A1 | 12/2015 | Wiklof | |
| 2016/0018103 A1 | 1/2016 | Karkow et al. | |
| 2016/0033125 A1 | 2/2016 | Krichtafovitch et al. | |
| 2016/0040872 A1 | 2/2016 | Colannino et al. | |
| 2016/0047542 A1 | 2/2016 | Wiklof et al. | |
| 2016/0091200 A1 | 3/2016 | Colannino et al. | |

(56) References Cited

U.S. PATENT DOCUMENTS

| | | |
|---|---|---|
| 2016/0109118 A1 | 4/2016 | Krichtafovitch et al. |
| 2016/0123576 A1 | 5/2016 | Colannino et al. |
| 2016/0123577 A1 | 5/2016 | Dumas et al. |
| 2016/0138799 A1 | 5/2016 | Colannino et al. |
| 2016/0138800 A1 | 5/2016 | Anderson et al. |
| 2016/0161115 A1 | 6/2016 | Krichtafovitch et al. |
| 2016/0215974 A1 | 7/2016 | Wiklof |
| 2016/0273763 A1 | 9/2016 | Colannino et al. |
| 2016/0273764 A1 | 9/2016 | Colannino et al. |
| 2016/0290633 A1 | 10/2016 | Cherpeske et al. |
| 2016/0290639 A1 | 10/2016 | Karkow et al. |
| 2016/0298836 A1 | 10/2016 | Colannino et al. |
| 2016/0363315 A1 | 12/2016 | Colannino et al. |

FOREIGN PATENT DOCUMENTS

| | | |
|---|---|---|
| EP | 2738460 | 6/2014 |
| FR | 2577304 | 12/1989 |
| GB | 1042014 | 9/1966 |
| JP | 58-019609 | 2/1983 |
| JP | 60-216111 | 10/1985 |
| JP | 61-265404 | 11/1986 |
| JP | H 07-48136 | 2/1995 |
| JP | 2001-021110 | 1/2001 |
| JP | 2001033040 | 2/2001 |
| WO | WO 1995/034784 | 12/1995 |
| WO | WO 1996/001394 | 1/1996 |
| WO | WO 2013/181569 | 12/2013 |
| WO | WO 2015/017084 | 2/2015 |
| WO | WO 2015/089306 | 6/2015 |
| WO | WO 2015/123683 | 8/2015 |
| WO | WO 2016/003883 | 1/2016 |
| WO | WO 2016/018610 | 2/2016 |
| WO | WO 2016/140681 | 9/2016 |

OTHER PUBLICATIONS

Timothy J.C. Dolmansley et al., "Electrical Modification of Combustion and the Affect of Electrode Geometry on the Field Produced," Modelling and Simulation in Engineering, May 26, 2011, 1-13, vol. 2011, Himdawi Publishing Corporation.

James Lawton and Felix J. Weinberg. "Electrical Aspects of Combustion." Clarendon Press, Oxford. 1969, p. 81.

James Lawton and Felix J. Weinberg. "Electrical Aspects of Combustion." Clarendon Press, Oxford. 1969, p. 141, fig. (4.131a).

M. Zake et al., "Electric Field Control of NOx Formation in the Flame Channel Flows." Global Nest: the Int. J. May 2000, vol. 2, No. 1, pp. 99-108.

NO VOLTAGE APPLIED

300 HZ 10kV Neg

NO VOLTAGE APPLIED

1000 HZ 10kV Neg

METHOD FOR COMBUSTION OF MULTIPLE FUELS

CROSS REFERENCE TO RELATED APPLICATIONS

The present application is a U.S. Divisional Application of co-pending U.S. patent application Ser. No. 15/050,177, entitled "SYSTEM FOR COMBUSTION OF MULTIPLE FUELS," filed Feb. 22, 2016. Co-pending U.S. patent application Ser. No. 15/050,177 is a continuation-in-part of U.S. patent application Ser. No. 13/731,109, entitled "MULTIPLE FUEL COMBUSTION SYSTEM AND METHOD," filed Dec. 30, 2012, issued as U.S. Pat. No. 9,267,680, issued Feb. 23, 2016. U.S. patent application Ser. No. 13/731,109 claims priority benefit from U.S. Provisional Patent Application No. 61/616,223, entitled "MULTIPLE FUEL COMBUSTION SYSTEM AND METHOD," filed Mar. 27, 2012. Co-pending U.S. patent application Ser. No. 15/050,177 is also a continuation-in-part of U.S. patent application Ser. No. 14/203,539, entitled "ELECTRICALLY-DRIVEN CLASSIFICATION OF COMBUSTION PARTICLES," filed Mar. 10, 2014, issued as U.S. Pat. No. 9,371,994, issued Jun. 21, 2016. U.S. patent application Ser. No. 14/203,539 claims priority benefit from U.S. Provisional Patent Application No. 61/775,482, entitled "ELECTRICALLY-DRIVEN CLASSIFICATION OF COMBUSTION PARTICLES," filed Mar. 8, 2013; co-pending U.S. patent application Ser. No. 15/050,177, U.S. patent application Ser. No. 13/731,109, U.S. patent application Ser. No. 14/203, 539, U.S. Provisional Patent Application No. 61/616,223, and U.S. Provisional Patent Application No. 61/775,482 are each, to the extent not inconsistent with the disclosure herein, incorporated by reference.

SUMMARY

According to an embodiment, electro-dynamic and/or electrostatic fields may be applied to a co-fired combustion system to enhance combustion property(ies). In an example system, a bench-top scale model selectively introduced an AC field across a simulated tire-derived fuel (TDF) (a cut up bicycle inner-tube) held in a crucible over a propane premixed flame. Without the electric field, the simulated TDF smoked profusely. With the electric field turned on, there was not any visible soot (although instrumentation detected a low level of soot). A cause and effect relationship was established by repeatedly turning on and turning off the electric fields. There was no observable hysteresis effect—switch on=no visible soot, switch off=visible soot.

According to an embodiment, a co-fired combustion apparatus may include a first fuel-introduction body defining a portion of a first combustion region. This may correspond to the premix nozzle and a flame region, for example. The first combustion region may be configured to combust a first fuel (e.g., propane) in a first combustion reaction. The apparatus may also include a second fuel-introduction body defining at least a portion of second combustion region. For example, the second fuel-introduction body may include the crucible described above. The second combustion region may be configured to combust a second fuel in a second combustion reaction. The first combustion reaction may be operable to sustain the second combustion reaction. For example, the simulated TDF was not readily ignited until heated by the propane flame. An electrode assembly associated with the second combustion region may be operable to be driven to or held at one or more first voltages. In the example above, the electrode assembly included the metallic crucible itself. A grounded 4-inch stack that was located approximately axial to the crucible may be envisioned as providing an image charge that varied to solve a field equation driven by the AC waveform.

Accordingly to another embodiment, a method of co-fired combustion may include maintaining the first combustion reaction by combusting the first fuel at the first combustion region. In other words, the propane combustion reaction $C_3H_8+5O_2 \rightarrow 3CO_2+4H_2O$ may be a self-sustaining exothermic reaction. The first combustion region may have a portion thereof defined by the first fuel-introducing body. The method may further include maintaining a second combustion reaction by combusting a second fuel at a second combustion region having a portion defined by a second fuel-introducing body. The second combustion may be sustained by the first combustion reaction. According to embodiments, the method includes applying at least one first electrical potential (which may include a time-varying electrical potential) proximate the second combustion region.

According to an embodiment, a combustion system may include a combustion volume configured to support a combustion reaction with a fuel and oxidant, and produce a flame and a main flow of a flue gas including entrained exhaust particles. The combustion system may further include at least one shaped electrode acting as a corona electrode, configured to generate a corona discharge, resulting in an ionic flow. The ionic flow may charge some of the entrained exhaust particles of the flue gas. The combustion system may further include a high voltage power supply (HVPS) configured to apply voltage to the at least one shaped electrode.

According to an embodiment, the charged exhaust particles may further be attracted to a collector plate, which may be may be formed as a single segment, or it may include a plurality of mechanically coupled segments.

According to another embodiment, the charged exhaust particles may be drawn into a director conduit for recirculation back into the combustion volume. The director conduit may further include a fan, impeller or vacuum means for facilitating the transfer of the particles.

According to yet another embodiment, the combustion system may include both a collector plate and a director conduit. Additionally, the combustion system may include a combustion control system, configured to monitor and control electric field necessary for generation of the corona discharge, via a programmable controller operatively coupled to one or more sensors placed inside the combustion volume, and to at the at least one shaped electrode.

According to an embodiment, a method for operating a combustion system includes outputting a first fuel and a first oxidant, supporting a first combustion reaction with the first fuel and first oxidant, and supporting a second combustion reaction of the heated second fuel to the produce a flue gas including entrained particles. The method also includes providing an electrical charge to the second combustion reaction, wherein the electrical charge is carried by the entrained particles, supporting a first field electrode adjacent to a main flow of the flue gas, applying a first voltage to the first field electrode, and electrostatically attracting the entrained particles toward the first field electrode to remove at least a portion of the entrained particles from a main flow of the flue gas.

According to an embodiment, a co-fired combustion apparatus, includes a first fuel-introduction body configured to provide a first fuel to a first combustion reaction and a second fuel-introduction body configured to provide a second fuel to a second combustion reaction, wherein the second combustion reaction emits an exhaust flow having a plurality of combustion particle classifications and wherein the first fuel introduction body is positioned relative to the second fuel introduction body to cause the first combustion reaction to at least intermittently provide heat to the second combustion reaction. The apparatus further includes an electrode assembly associated with the second fuel introduction body or a second combustion volume to which the second fuel introduction body provides the second fuel, the electrode assembly being configured to be driven to or maintained at one or more first voltages selected to provide an electric field to the second combustion volume, a charge source configured to supply electrical charges into the exhaust flow, a high voltage power supply (HVPS) configured to apply an electrical potential having a first polarity to the charge source and a collector plate including an electrical conductor coupled to receive an electrical potential having a second polarity from a node operatively coupled to the HVPS, the collector plate disposed above and a distal to the second combustion reaction and arranged to cause at least one combustion particle classification to flow to a collection location and to cause at least one different combustion particle classification to flow to one or more locations different from the collection location.

DETAILED DESCRIPTION

Figure 1:
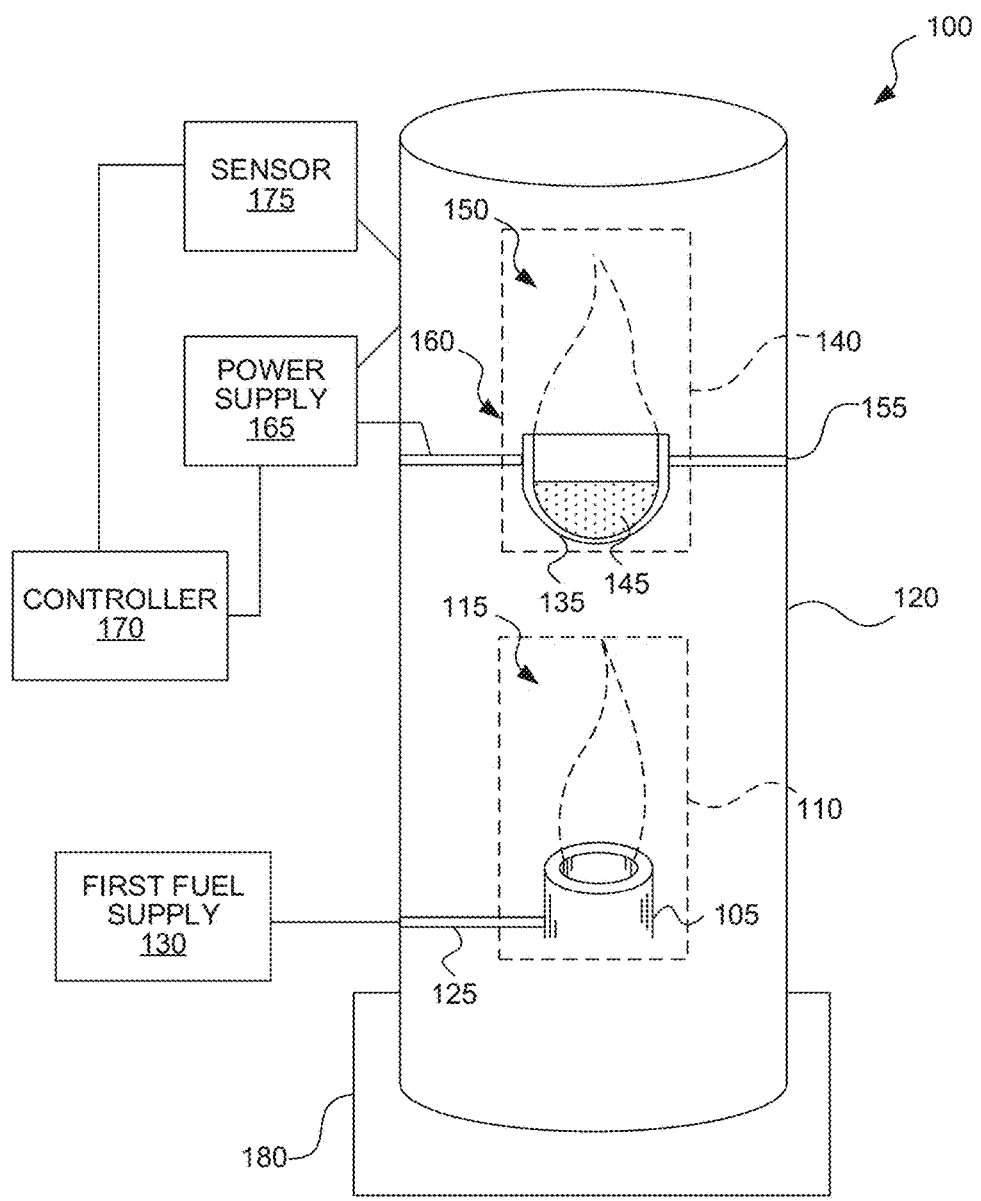
FIG. 1 is a diagram of a co-fired combustion apparatus, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a diagram of a co-fired combustion apparatus 100, according to an embodiment. The apparatus 100 may include a first fuel-introduction body 105 defining a portion of first combustion region 110. The first combustion region 110 may be configured to combust a first fuel (not shown) in a first combustion reaction 115. In an embodiment, the first fuel-introduction body 105 may be supported in a housing 120 by a first fuel-introduction-body support 125. The first fuel may be provided by a first fuel supply 130. The first fuel may be substantially liquid or gaseous. For example, the first fuel may include at least one of natural gas, propane, oil, or coal. In an embodiment, the first fuel-introduction body 105 may include a burner assembly that is configured to support a flame.

A second fuel-introduction body 135 may define a portion of a second combustion region 140. The second combustion region 140 may be configured to combust a second fuel 145 in a second combustion reaction 150. In an embodiment, the second fuel-introduction body 135 may include a crucible assembly, which may be operable to hold the second fuel 145. Alternatively, the second fuel-introduction body 135 may include a grate, a screen, a fluidized bed support, or another apparatus configured to introduce, contain and/or hold the second fuel 145 proximate the second combustion region 140. The second fuel-introduction body 135 may be supported in the housing 120 by a second fuel-introduction-body support 155. In an embodiment, the second fuel 145 may be substantially solid under standard conditions. The second fuel 145 may melt, melt and vaporize, sublime, and/or be dried responsive to heating from the first combustion reaction 115. In an embodiment, the second fuel 145 may include one or more of rubber, wood, glycerin, an industrial waste stream, a post-consumer waste stream, an industrial by-product, garbage, hazardous waste, human waste, animal waste, animal carcasses, forestry residue, batteries, tires, waste plant material, or landfill waste. In an embodiment, the second fuel 145 may be fluidized to form at least a portion of a fluidized bed.

In an embodiment, the first combustion reaction 115 may sustain the second combustion reaction 150. For example, the first combustion reaction 115 may generate heat which initiates or supports the second combustion reaction 150. Accordingly, in an embodiment, the first fuel-introduction body 105 may be positioned at a distance proximate to the second fuel-introduction body 135 so that the first combustion reaction 115 may support the second combustion reaction 150. In an embodiment, a portion of the apparatus 100 may be enclosed within a flue, stack, or pipe configured to convey at least a portion of a combustion product stream generated by the first and/or second combustion reactions 115, 150.

According to an embodiment, the first combustion region 110 may be substantially separated from the second combustion region 140. According to another embodiment, the first combustion region 110 may extend to overlap or occupy the entirety of the second combustion region 140. According to an embodiment, the first combustion reaction 115 may provide ignition for the second combustion reaction 150.

An electrode assembly 160 associated with the second combustion region 140 may be operable to be driven to or held at one or more first voltages such as a constant (DC) voltage, a modulated voltage, an alternating polarity (AC) voltage, or a modulated voltage with a DC voltage offset. In an embodiment, the electrode assembly 160 may include at least a portion of one or more of the second fuel-introduction body 135, the second fuel-introduction-body support 155, the housing 120, or an electrode (not shown) separate from the second fuel-introduction body 135, the second fuel-introduction body support 155, and the housing 120. In an embodiment, any of the second fuel-introduction body 135, the second fuel-introduction-body support 155, the housing 120, or a separate electrode assembly 160 may each be configured to be driven to or held at one or more voltage(s), which may or may not be the same voltage. For example, the housing 120 may be held at a ground voltage and the second fuel-introduction-body support 155 may be held at or driven to positive and/or negative voltages. In an embodiment, the housing 120 may rest on a grounding plate 180, which may ground the housing 120.

It was found that the smoke reduction was most pronounced when the first voltage included a high voltage greater than +1000 volts and/or less than −1000 volts. For example, in experiments, the voltage was an AC waveform with amplitude of +/−10 kilovolts. Other high voltages may be used according to preferences of the system designer and/or operating engineer.

The electrode assembly 160 may be configured to be driven to or held at a voltage produced by a voltage source including a power supply 165. The power supply 165 may be operatively coupled to controller 170, which is configured to drive or control the electrode assembly 160. In some embodiments, the electrode assembly 160 may include one or more electrodes positioned proximate to the second combustion region 140, which may or may not directly contact the second fuel-introduction body 135 or the second fuel 145. Such electrodes may be positioned in any desirable arrangement or configuration. In an embodiment, a portion of the first fuel-introduction body 105, a portion of the first fuel-introduction-body support 125, or a portion of an electrode (not shown) proximate to the first combustion region 110 may be configured to be held at one or more second voltage(s).

The apparatus 100 may optionally include one or more sensor(s) 175 operable to sense one or more conditions of the apparatus 100, components thereof, and/or the second fuel 145 combustion reaction 150. For example, a sensor 175 may sense heat, voltage, fluid flow, fluid turbulence, humidity, particulate matter, or one or more compounds or species. In an embodiment, the sensor 175 may be used to sense the condition or state of a combustion product stream generated by the second combustion reaction 150. A sensed state or condition of the combustion product stream generated by the second combustion reaction 150 may be used by a feedback controller 170 to modify or modulate the one or more voltages and/or waveforms that the electrode assembly 160 is held at or driven to.

For example, as further discussed herein, driving or holding the electrode assembly 160 at one or more voltages may affect the second combustion reaction 150. Driving or holding the electrode assembly 160 at one or more voltages may modify the efficiency, rate, thermal output, or turbulence, of the second combustion reaction 150. The sensor(s) 175 may be operable to detect such effects.

It was found that applying an electric field proximate to a combustion reaction may be used to improve the efficiency of the combustion reaction. The improvement in efficiency may include a reduction in undesirable combustion products such as unburned fuel, oxides of sulfur ($SO_x$), oxides of nitrogen ($NO_x$), hydrocarbons, and other species. Additionally, the improvement in efficiency may include an increase in thermal energy generated by the combustion reaction per the amount of fuel. In addition to being less harmful to the environment, supporting a cleaner combustion reaction may result in lower operating expense. Discharge of certain combustion pollutants may require the purchase of emission-permits for an amount of pollutant discharge. Reducing pollutant discharge in a given reaction may therefore allow a business to obtain fewer emission-permits and/or output more heat at a reduced cost. Additionally or alternatively, less fuel may be consumed to generate an equivalent amount of energy.

Increased efficiency of a combustion reaction may occur via one or more mechanisms. For example, applying an electric field proximate to a combustion reaction may increase the number of collisions between reactants, which may increase the reaction rate. In one example, applying an electric field proximate to a combustion reaction may increase the collision energy of reactants and therefore increase the rate of reaction. In another example, applying an electric field proximate to a combustion reaction may provide a self-catalysis effect for various desirable reactions and may reduce the reaction activation energy by urging reactants to come together in a correct reaction orientation. In a further example, applying an electric field proximate to a combustion reaction may increase the turbulence of a reaction and thereby increase the mixture or introduction rate of reactants (e.g., increased mixing of oxygen with fuel), which may promote a more efficient or complete combustion reaction (e.g., where reactants combust to produce a greater proportion of desired reaction products, fewer unreacted reactants and undesired products or by-products of the combustion reaction will be emitted).

Figure 2:
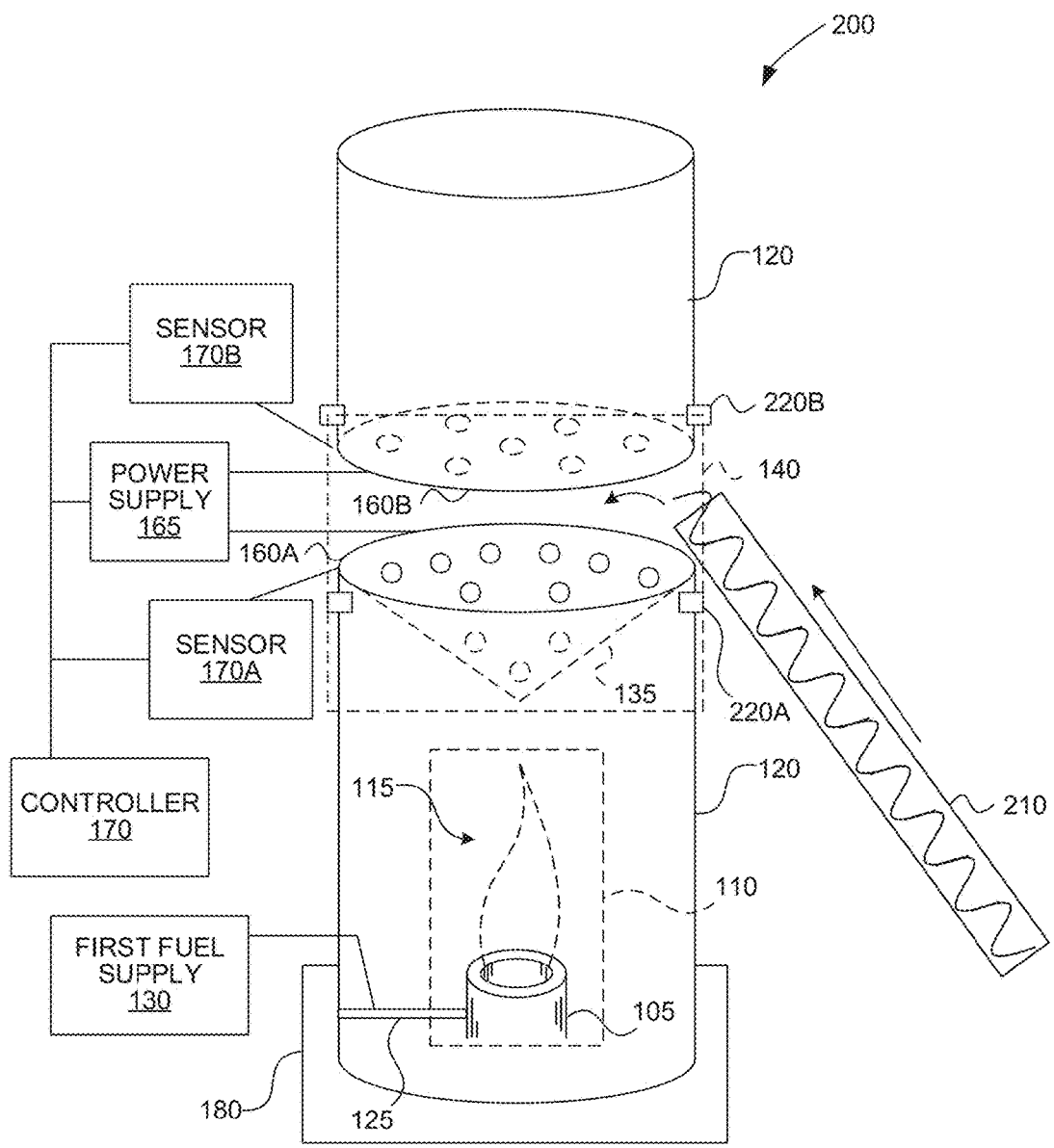
FIG. 2 is a diagram of a co-fired combustion apparatus, according to an embodiment.

FIG. 2 is a diagram of a co-fired combustion apparatus 200, according to an embodiment. The apparatus 200 may include a first fuel-introduction body 105 defining a portion of first combustion region 110. The first combustion region 110 may be configured to combust a first fuel from a first fuel supply 130 in a first combustion reaction 115. In an embodiment, the first fuel-introduction body 105 may be supported in a housing 120 by a first fuel-introduction-body support 125.

The apparatus 200 may also include a second fuel-introduction body 135 defining a portion of a second combustion region 140. The second combustion region 140 may be configured to combust a second fuel (not shown) in a second combustion reaction (not shown). In an embodiment, the second fuel-introduction body 135 may include a crucible assembly, which may be configured to hold the second fuel. Alternatively, the second fuel-introduction body 135 may include a grate, a screen, a fluidized bed support, or another apparatus configured to introduce and/or contain or hold the second fuel proximate the second combustion region 140. The apparatus may also include a stoker 210, configured to introduce the second fuel to the fuel-introduction body 135.

For example, in an embodiment, the second fuel may include timber waste products, and the stoker 210 may be configured to convey timber waste products into the fuel-introduction body 135 so that sufficient second fuel is present to sustain a relatively constant combustion fuel volume within the second fuel-introduction body 135. For example, as the second fuel is consumed, additional second fuel may be introduced by the stoker 210 so that the second combustion reaction may continue. Optionally, the second fuel-introduction body 135 may include a containment body 160B configured to prevent entrainment of unburned second fuel particles in flue gas exiting through the top of the body 120.

In another embodiment, the second fuel may include black liquor, such as a residue from a sulfite pulp mill. The stoker 210 may be configured to convey liquid or semi-solid black liquor to the second combustion region 140.

Optionally, the burner 200 may include a heat recovery system including one or more heat transfer surfaces such as water tube boiler tubes to convert heat output by the second (not shown) and/or first combustion reaction 115 to heated water or steam. According to an embodiment, the application of electrical energy to at least the second combustion reaction (not shown) may reduce tendency for combustion byproducts or entrained materials to be deposited on heat transfer surfaces. This may allow a longer operating duration between service shut-downs to clean heat transfer surfaces.

A first and second electrode assembly 160A, 160B associated with the second combustion region 140 may be operable to be driven to or held at one or more voltages using a substantially constant (DC) voltage, a modulated voltage, an alternating polarity (AC) voltage, or a modulated voltage with DC voltage offset. The first electrode 160A assembly may be configured to be driven to or held at one or more first voltages. The second electrode 160B assembly may be configured to be driven to or held at one or more second voltages. In an embodiment, the first and second one or more voltages may be the same.

The first and second electrode assemblies 160A, 160B may be electrically isolated from a portion of the housing 120 via respective insulators and/or air gaps 220A, 220B. In an embodiment, the first and second electrode assembly 160A, 160B may be held or driven to a first and second voltage respectively, and the housing 120 may be held at or driven to a third voltage. For example, the housing 120 may be held at ground potential via a grounding plate 180.

The first and second electrode assembly 160A, 160B may each be configured to be driven to or held at a voltage produced by a voltage source including a power supply 165. The power supply 165 may be operatively coupled to controller 170, which may be configured to control the output voltage, current, and/or waveform(s) output by the power supply 165 to the first and/or second electrode assemblies 160A, 160B.

The apparatus 200 may optionally include a first and/or second sensor 170A, 170B operable to sense one or more conditions of the apparatus 200 or components thereof. For example, the first sensor 170A may be associated with the first electrode assembly 160A, and the second sensor 170B may be associated with the second electrode assembly 160B.

Figure 3:
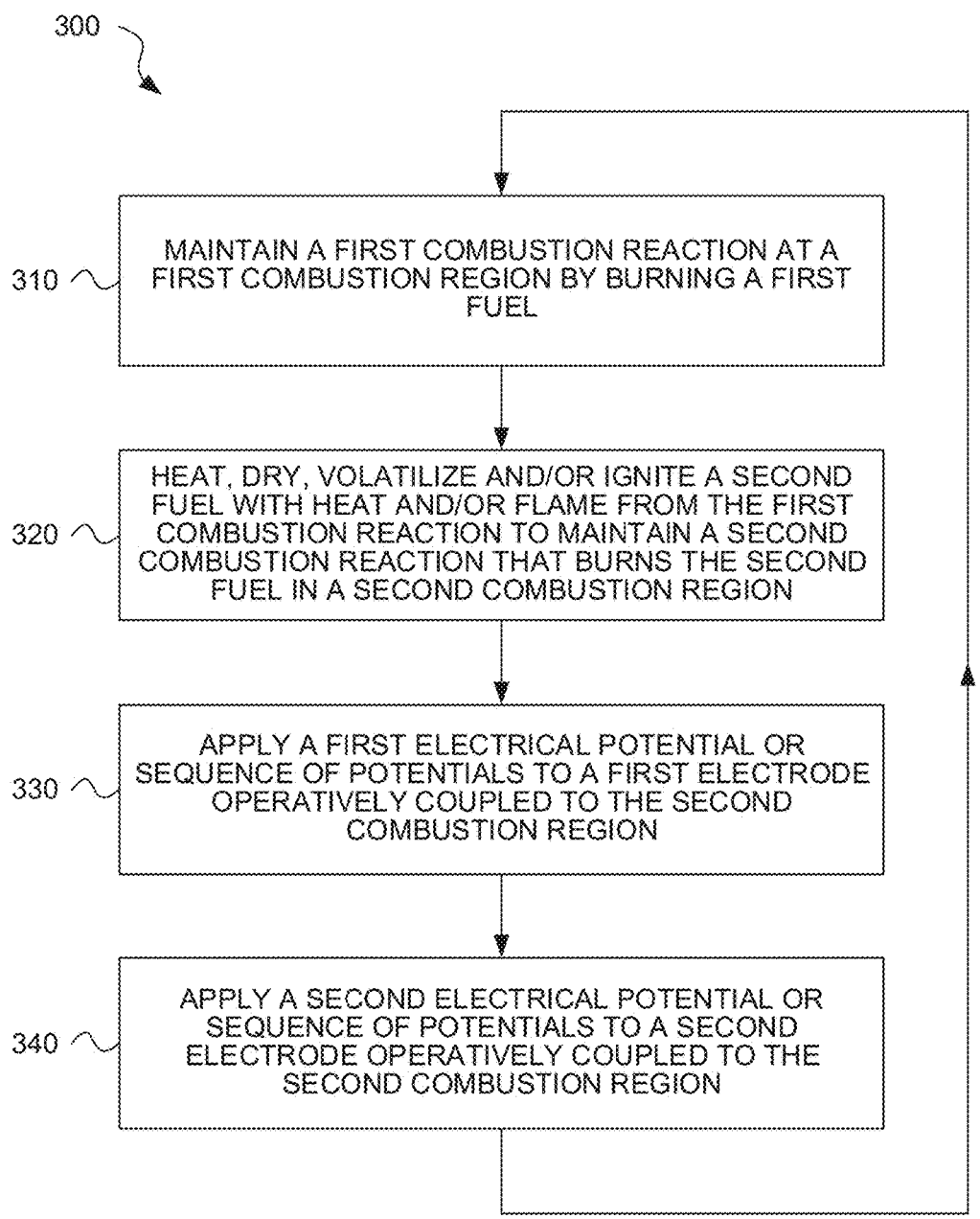
FIG. 3 is a flow chart of a co-fired combustion method, according to an embodiment.
Figures 4, 5:
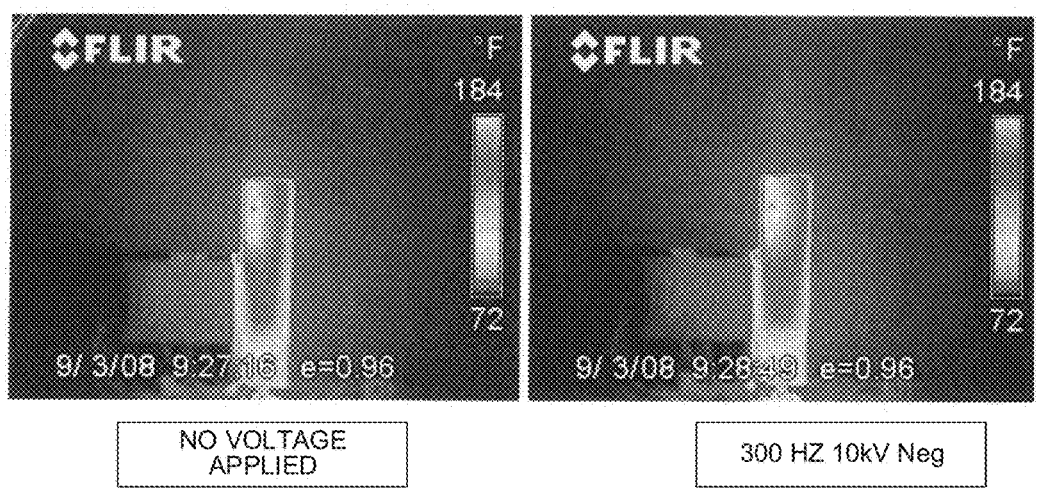
FIGS. 4-27 are thermographic images captured during a heat-exchange experiment wherein a voltage was applied to and removed over time from a crucible supporting a combustion, according to embodiments.
Figures 6, 7:
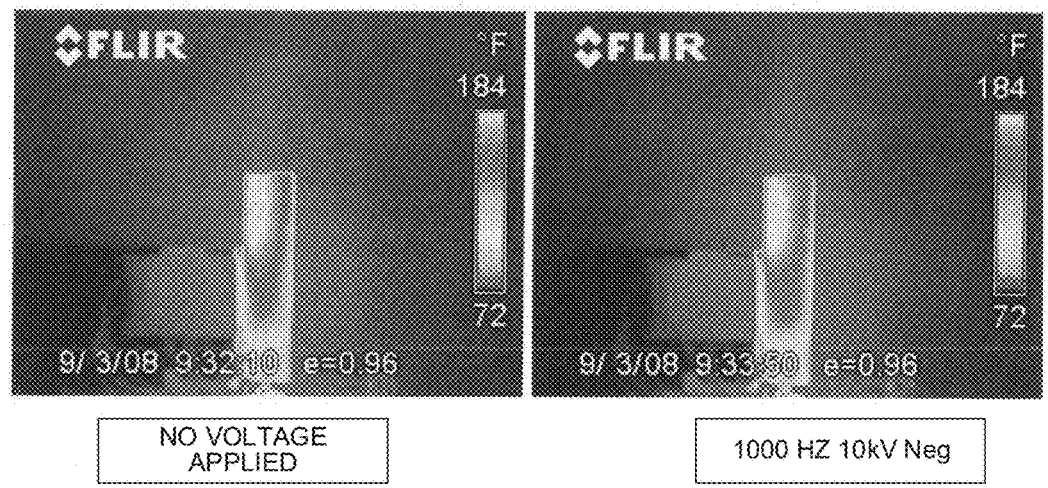
Figure 8:
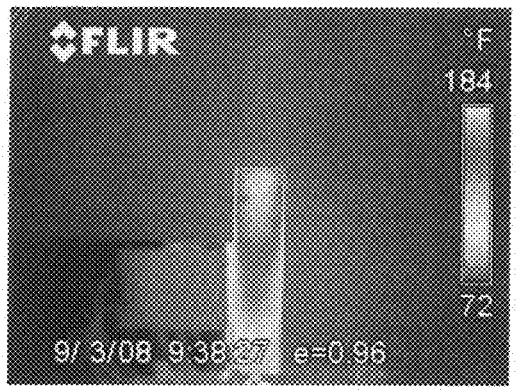
Figure 9:
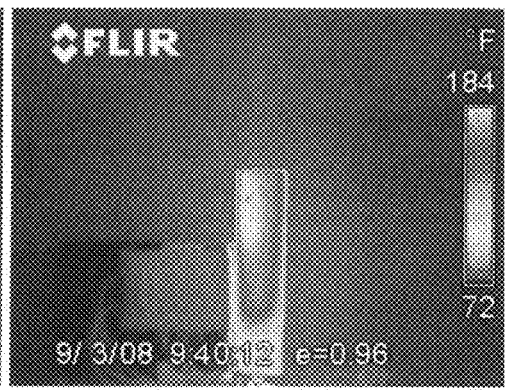
Figure 10:
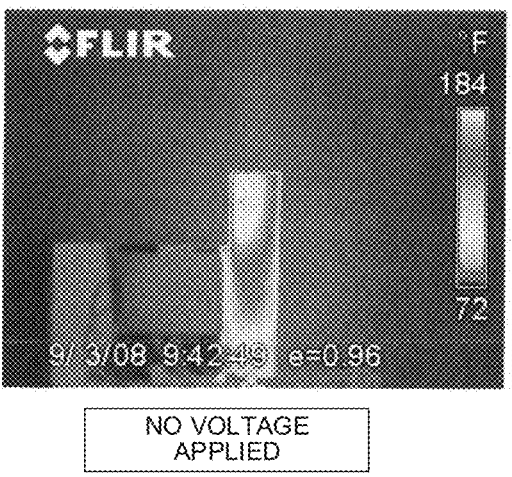
Figure 11:
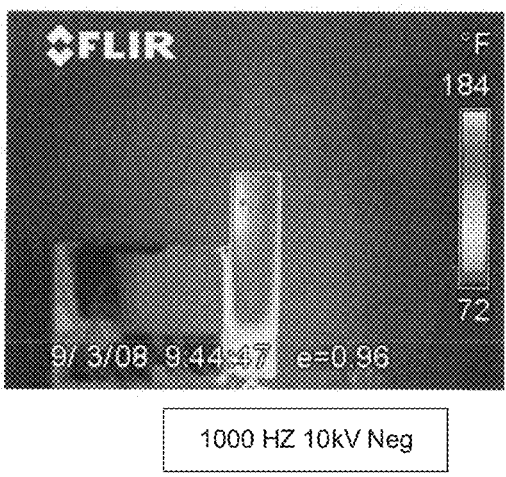
Figures 12, 13:
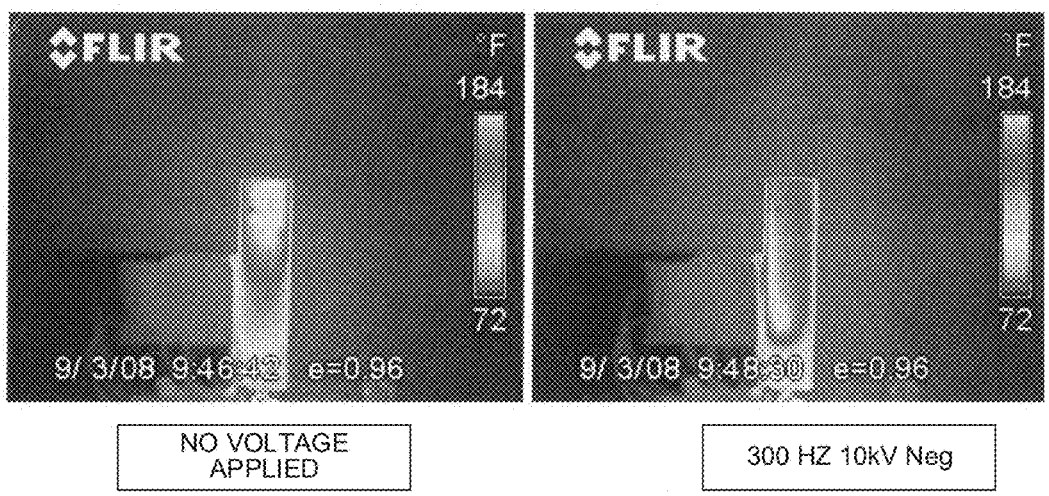
Figures 14, 15:
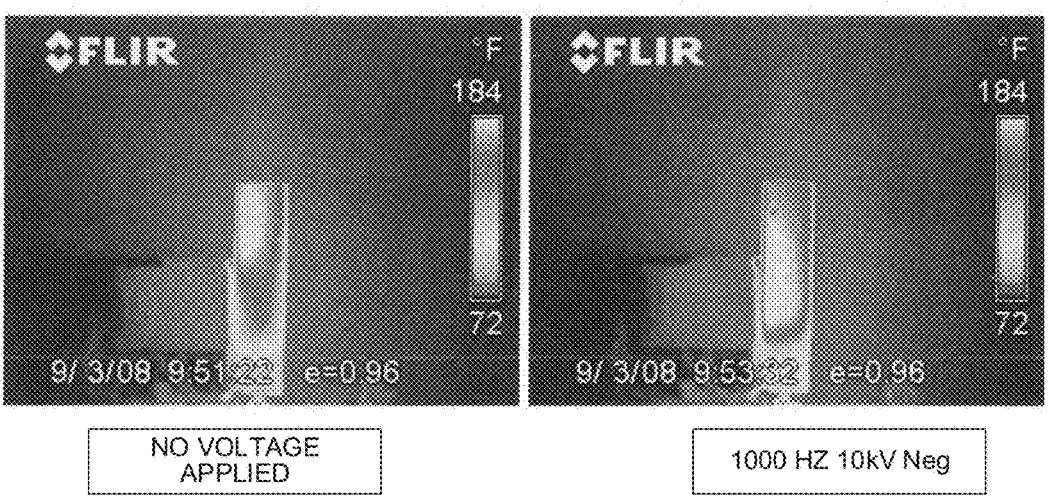
Figures 16, 17:
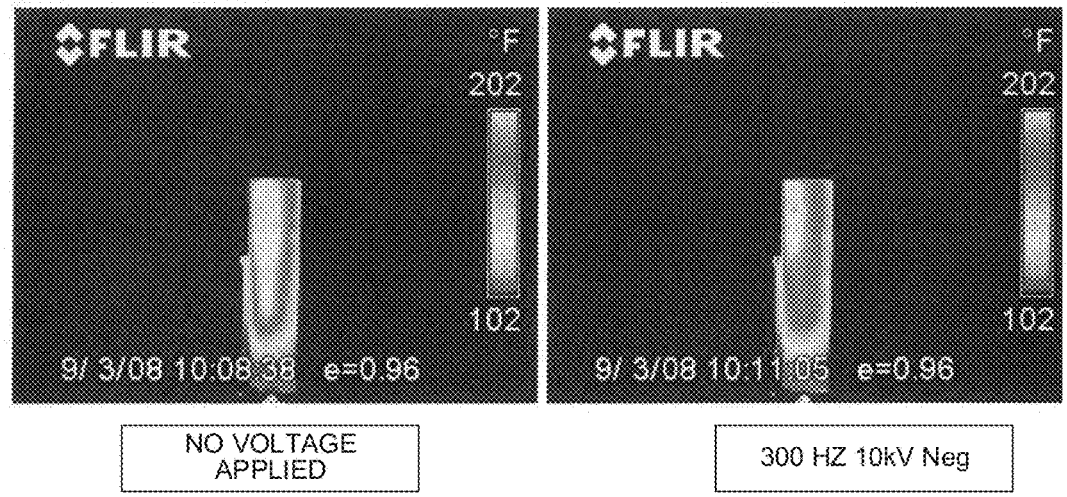
Figures 18, 19:
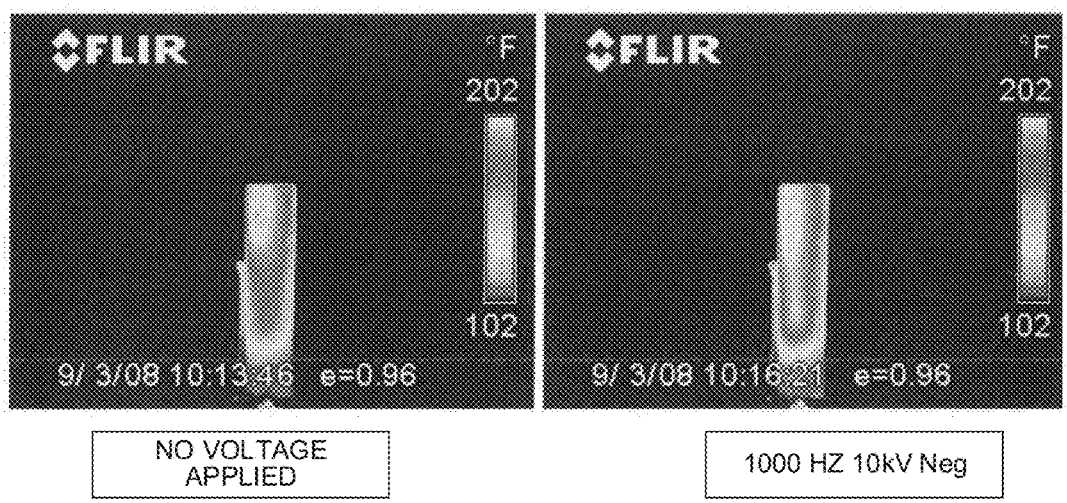
Figures 20, 21:
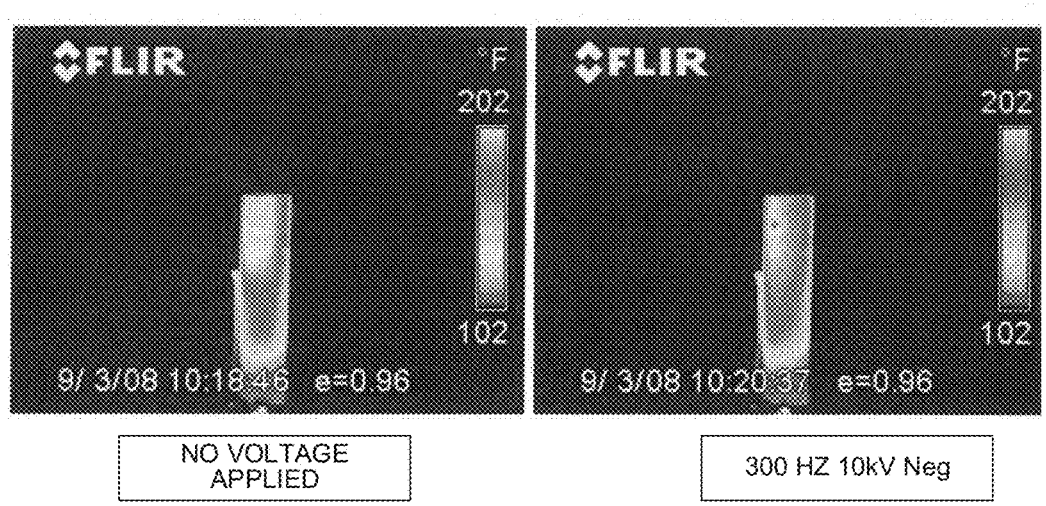
Figures 22, 23:
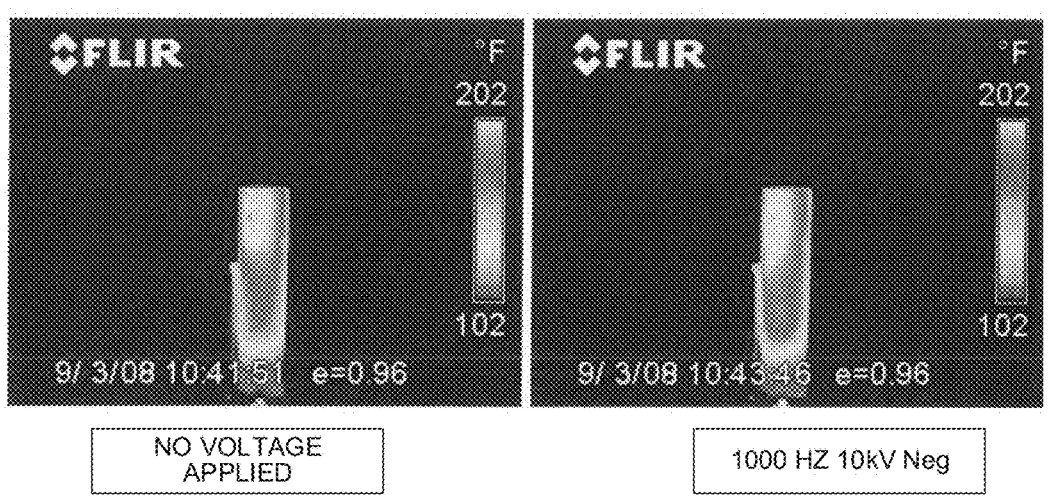
Figures 24, 25:
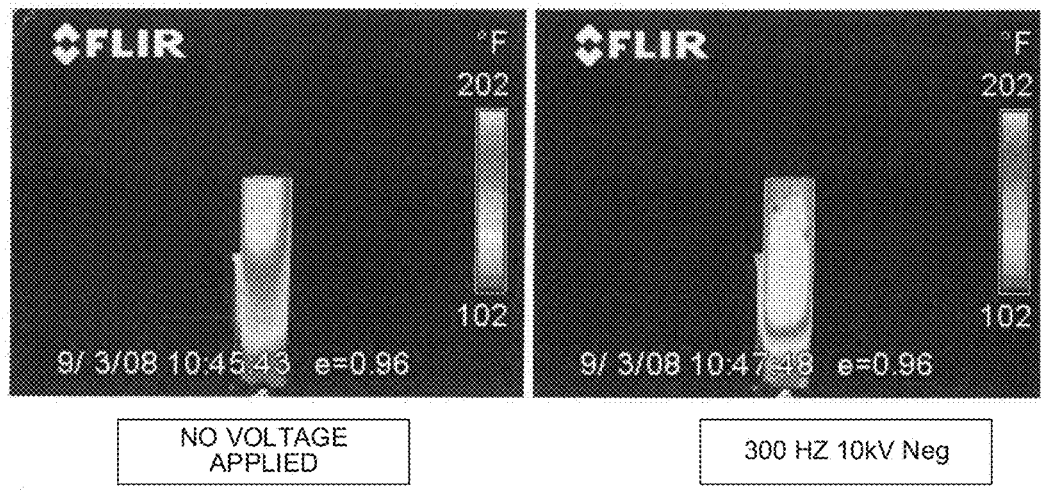
Figures 26, 27:
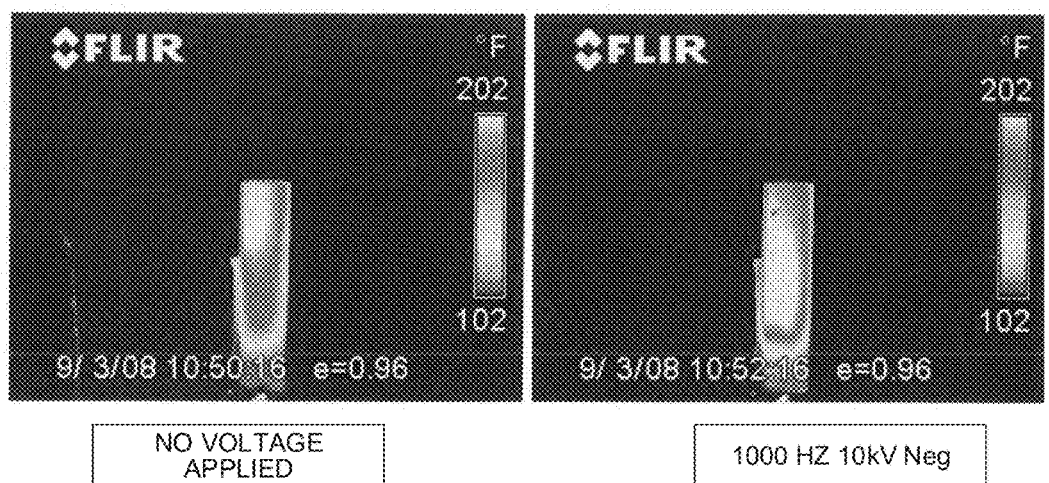

FIG. 3 is a flow chart showing a method 300 for operating a co-fired combustion system, according to an embodiment. The method 300 begins in block 310 where a first combustion is maintained at a first combustion region by combusting a first fuel. For example, referring to FIGS. 1 and 2, the first combustion 115 may be maintained at the first fuel-introduction body 105 in the first combustion region 110. The first fuel may be a relatively free-burning fuel such as a hydrocarbon gas, a hydrocarbon liquid, or coal. The first fuel should be chosen to have a flame temperature that is sufficiently high to support and/or ignite combustion of the second fuel.

The method 300 continues in block 320, where a second combustion reaction is sustained by heat and/or ignition from the first combustion reaction. The second combustion reaction may be maintained at a second combustion region by combusting the second fuel. For example referring to FIGS. 1 and 2, the second combustion reaction 150 may be sustained by the first combustion reaction 115, at the second fuel-introduction body 135 in the second combustion region 140. According to an embodiment, heat from the first combustion reaction may dry, volatilized, and/or raise a vapor pressure of the second fuel sufficiently to allow the second fuel to burn. Additionally or alternatively, the first combustion region may overlap with or contain the second combustion region. The first combustion reaction may provide ignition and/or maintain combustion of the second fuel.

The method 300 continues in block 330 where a first potential or sequence of potentials is applied to a first electrode operatively coupled to the second combustion region. For example, referring to FIG. 1 a first potential or sequence of potentials may be applied to the electrode assembly 160 proximate to the second combustion region 140. Referring to FIG. 2, a first potential may be applied to the first electrode assembly 160A proximate to the second combustion region 140. According to an embodiment, the first potential or sequence of potentials may include a substantially constant (DC) voltage, a modulated voltage, an alternating polarity (AC) voltage, or a modulated voltage with DC voltage offset.

The method 300 continues in block 340, where a second electrical potential or sequence of potentials is applied to a second electrode operatively coupled to the second combustion region. For example, referring to FIG. 1 a second potential may be applied to the housing 120 proximate to the second combustion region 140. Referring to FIG. 2, a second potential may be applied to the second electrode assembly 160B proximate to the second combustion region 140.

The electrical potentials applied in steps 330 and 340 may be selected to cause an increase in reaction rate and/or an increase in the reaction extent reached by the second combustion reaction. According to an embodiment, the first electrical potential or sequence of potentials may include a time-varying high voltage. The high voltage may be greater than 1000 volts and/or less than −1000 volts. According to an embodiment, the high voltage may include a polarity-changing waveform with an amplitude of +/1 10,000 volts or greater. The waveform may be a periodic waveform having a frequency of between 50 and 300 Hertz, for example. In another example, the waveform may be a periodic waveform having a frequency of between 300 and 1000 Hertz. According to an embodiment, the second electrical potential may be a substantially constant (DC) ground potential.

The method is shown looping from step 340 back to step 310. In a real embodiment, the steps 310, 320, 330, and 340 are generally performed simultaneously and continuously while the second fuel is being burned (after start-up and before shut-down).

EXAMPLE

Referring to FIG. 1, a burner assembly 105 was disposed within a cylindrical housing 120, defining a first combustion region 110. The burner assembly 105 was operatively connected to a propane gas supply (first fuel supply 130), which was used to sustain a propane flame on the burner assembly 105 in a first combustion 115. The housing 120 was approximately 3 inches in diameter and approximately 1 foot tall. The burner assembly 105 was substantially cylindrical having a diameter of approximately ¾ inch, and a height of approximately 1 inch.

A crucible 135 having a diameter of approximately ¾ inch was positioned within the housing 120 above the propane first combustion 115. The crucible 135 held a mass of rubber pieces (second fuel 145), which were obtained by cutting pieces from a bicycle inner-tube. The propane first combustion 115 caused the rubber pieces to ignite, thus generating a second combustion 150. The second combustion 150 of the rubber pieces generated a combustion product stream (not shown), which visually presented as black smoke. The housing 120 was used to contain and direct the combustion product stream, and rested on a grounding plate 180, which held the housing 120 at a ground voltage.

A modulated voltage of 10 kV was then applied to the crucible 135 at a frequency of 300-1000 Hz. The smoke generated by the combustion of the rubber pieces changed from a black smoke to no visible smoke. This indicated that the combustion product stream included fewer particulates. The voltage was removed from the crucible 135 and the combustion product stream again presented as black smoke. The voltage was again applied to the crucible 135 and the combustion product stream again presented as a lighter or substantially no visible smoke.

In a first particulate-residue trial, a first volume of rubber pieces was burned in the crucible 135 and a first paper filter was positioned on the top end of the housing 120 to collect particulate matter in the combustion product stream. A voltage was not applied to the crucible 135.

In a second particulate-residue trial, a second volume of rubber pieces (having substantially the same mass as the first volume of the first trial) was burned in the crucible 135 and a second paper filter was positioned on the top end of the housing 120 to collect particulate matter. A modulated voltage of 10 kV was then applied to the crucible 135 at a frequency of 300-1000 Hz.

The first and second filter papers were compared, and the first filter paper exhibited a substantial layer of black particulate matter. The second filter paper on exhibited a light discoloration of the paper, but did not have a layer of particulate matter. This result further indicated that the application of the voltage created a substantial reduction in particulate matter in the combustion product stream of the combusting rubber pieces.

In a first heat-exchange trial, a first volume of rubber pieces was burned in the crucible 135 and thermographic images of the combustion were recorded over time using a Fluke Ti20 Thermal Analyzer at a perspective substantially the same as the perspective of FIG. 1. A propane fuel volume of 0.4 actual cubic feet per hour (acfh) was supplied to the burner assembly 105 during the trial. A voltage was not applied to the crucible 135.

In a second heat-exchange trial, a second volume of rubber pieces (having substantially the same mass as the first volume of the first trial) was burned in the crucible 135 and thermographic images of the combustion were recorded over time using a Fluke Ti20 Thermal Analyzer at a perspective substantially the same as the perspective of FIG. 1. A propane fuel volume of 0.2 actual cubic feet per hour (acfh) was supplied to the burner assembly 105 during the trial (i.e., half of the fuel compared to the first trial). A modulated voltage of 10 kV was then applied to the crucible 135 at a frequency of 300-1000 Hz.

The thermographic images of the first and second heat-exchange trial were compared over time. At 15 seconds, both burners registered approximately 130° F. At 45 seconds the first heat-exchange trial continued to register 130° F.; the second heat-exchange trial burner (with 50% fuel) registered approximately 186° F. These trials indicated that even with 50% fuel volume, application of a voltage to the crucible 135 generated a higher combustion temperature.

In a third heat-exchange trial, a volume of rubber pieces was burned in the crucible 135 and thermographic images of the combustion were recorded over time using a Fluke Ti20 Thermal Analyzer at a perspective substantially the same as the perspective of FIG. 1. Over time, a modulated voltage of 10 kv was then applied to the crucible 135 at a frequency of 300 Hz for a period of time; the voltage was removed for a period of time; a modulated voltage of 10 kv was then applied to the crucible 135 at a frequency of 1000 Hz for a period of time; and the voltage was removed for a period of time. The application and removal of these voltages was repeated six times. An image was captured at the end of each period.

FIGS. 4-27 depict the thermographic images captured during the heat-exchange trial from a time of 9:27:16 until 10:52:16 and show that application of a voltage to the crucible 135 generated a higher combustion temperature.

Schlieren photography was used to visualize the flow of the combustion product stream generated by the combustion of rubber pieces within the crucible 135. When no voltage was applied to the crucible 135, the flow of the combustion product stream appeared to be laminar flow; however, when a modulated voltage of 10 kV was then applied to the crucible 135 at a frequency of 300-1000 Hz, the combustion product stream appeared to have turbulent flow. In other words, the combustion product stream behaved according to a low Reynolds number, laminar flow regime when no voltage was applied, and exhibited a high amount of turbulence evocative of a high Reynolds number when a voltage was applied, even though mass flow rates were nearly identical.

With reference to FIGS. 1-3, According to an embodiment, a co-fired combustion apparatus 100 may include a first fuel-introduction body 105 configured to provide a first fuel (not shown) to a first combustion reaction 115, and a second fuel-introduction body 135 configured to provide a second fuel 145 to a second combustion reaction 150. The first fuel introduction body 105 may be positioned relative to the second fuel introduction body 135 to cause the first combustion reaction 115 to at least intermittently provide heat to the second combustion reaction 150. The co-fired combustion apparatus 100 may further include an electrode assembly 160 associated with the second fuel introduction body 135 or a second combustion volume to which the second fuel introduction body 135 provides the second fuel 145. The electrode assembly 160 may be configured to be driven to or maintained at one or more first voltages selected to provide an electric field to the second combustion volume. The electrode assembly 160 may include one or more electrodes proximate or within the second combustion region 140. Additionally, it may include the second fuel-introduction body 135.

A portion of the apparatus may be enclosed within a housing 120. The portion of the housing 120 may be operable to be driven to or held at one or more second voltages. In an embodiment, the electrode assembly 160 may include a portion of the housing 120. Additionally or alternatively, the electrode assembly 160 may include the second fuel-introduction body 135. The second fuel-introduction body 135 may include a crucible assembly configured to support the second fuel 145. In an embodiment, the electrode assembly 160 may include the crucible assembly.

According to an embodiment, the first fuel-introduction body 105 may include a burner assembly. Additionally, the first fuel-introduction body 105 may be operable to be driven to or held at one or more second voltages. The electrode assembly 160 associated with the second combustion region 140 may be operable to increase combustion efficiency of the second combustion when the electrode assembly 160 is driven to or held at the one or more first voltages. The second combustion may produce a combustion product stream having a flow, wherein the electrode assembly 160 associated with the second combustion region 140 may be operable to generate a combustion product stream flow having turbulent flow when the electrode assembly 160 is driven to or held at the one or more first voltages.

According to an embodiment of a co-fired combustion apparatus, the first fuel may be substantially liquid or gaseous, whereas the second fuel 145 may be substantially solid. For example, the first fuel may include at least one of natural gas, propane, butane, coal, or oil. The second fuel 145 may include one or more of rubber, wood, glycerin, an industrial waste stream, a post-consumer waste stream, an industrial by-product, garbage, hazardous waste, human waste, animal waste, animal carcasses, forestry residue, batteries, tires, waste plant material, or landfill waste. Additionally, the second fuel 145 may form a portion of a fluidized bed.

In an embodiment, a co-fired combustion apparatus may include a stoker 210 configured to introduce the second fuel 145 to the second combustion region 140.

In an embodiment, a portion of the co-fired apparatus may be enclosed within a flue, stack, or pipe configured to convey a combustion product stream generated by at least the second combustion.

In an embodiment, the co-fired combustion apparatus may further include a first burner assembly configured to support the first combustion, and a burner support configured to support the first burner assembly in a housing 120.

According to an embodiment, a method of co-fired combustion may include step maintaining a first combustion by combusting a first fuel at a first combustion region having a portion defined by a first fuel-introducing body, step maintaining a second combustion by combusting a second fuel at a second combustion region having a portion defined by a second fuel-introducing body, the second combustion sustained by the first combustion, and step applying at least one first electrical potential proximate to the second combustion region. The method of co-fired combustion may further include step applying at least one second electrical potential proximate to the first combustion region. Additionally or alternatively, the method may also include applying at least one second electrical potential at another location proximate to the second combustion region.

In an embodiment, the method of co-fired combustion may include conveying a combustion product stream generated by at least the second combustion through a flue, stack or pipe.

According to an embodiment of the method of co-fired combustion, an electrode assembly may be operable to apply the at least one first electrical potential. The electrode assembly may include one or more electrodes proximate to the second combustion region. The electrode assembly associated with the second combustion region may be operable to increase combustion efficiency of the second combustion when the electrode assembly applies the one or more first electrical potential, compared to not applying the one or more first electrical potential.

According to an embodiment of the method of co-fired combustion, the second combustion may produce a combustion product stream including particulates. The electrode assembly associated with the second combustion region may be operable to increase combustion of the particulates in the combustion product stream when the electrode assembly applies the one or more first electrical potential. The second combustion may produce a combustion product stream having a flow, wherein applying the first electrical potential proximate to the second combustion region may be operable to generate a combustion product stream flow having greater turbulence than another flow having substantially equal Reynolds number with no electrical potential applied.

Additionally, the second fuel may be introduced to the second combustion region with a stoker. In an embodiment, the first fuel may be substantially liquid or gaseous, and the second fuel may be substantially solid. Additionally or alternatively, the second fuel may include one or more of rubber, wood, glycerin, an industrial waste stream, a post-consumer waste stream, an industrial by-product, garbage, hazardous waste, human waste, animal waste, animal carcasses, forestry residue, batteries, tires, waste plant material, or landfill waste material. The first fuel may include natural gas, propane, butane, coal or oil.

As used herein, the following terms may have the following definitions:

"corona discharge" may refer to an electrical discharge, either positive or negative, produced by the ionization of a fluid surrounding an electrically energized conductor.

"ionic wind" may refer to a stream of ions generated from a tip electrode by a strong electric field exceeding a corona discharge voltage gradient and that may be used to charge exhaust combustion particles.

Figure 28:
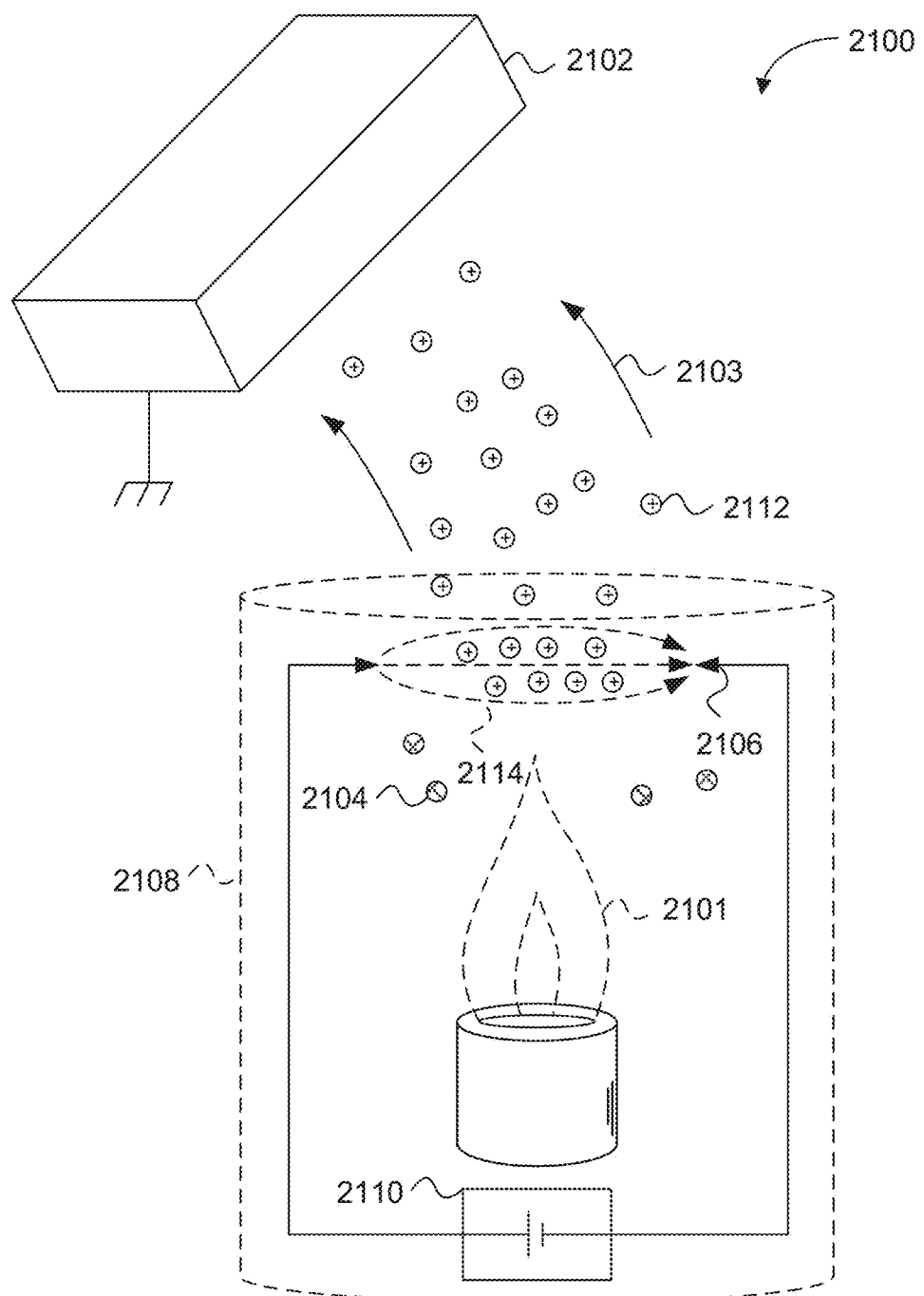
FIG. 28 depicts an embodiment of a combustion system employing a corona discharge structure and a collector plate, according to an embodiment.

FIG. 28 depicts an embodiment of a combustion system 2100 employing a corona discharge device using at least two sharp shaped electrodes 2106, i.e., electrodes that taper to a sharp tip directed outward toward the combustion exhaust gases 2103 and a collector plate 2102, according to an embodiment. Suitable materials for the collector plate 2102 may include conductive materials such as iron, steel (such as stainless steel), copper, silver or aluminum or alloys of each of these metals provided that the preponderant constituent of the alloy consists of iron, steel, copper, silver or aluminum. Combustion itself may be provided for though a variety of fuels such as solid, liquid and gas hydrocarbon fuels together with various oxidizers, the most common being ambient air. Other fuel and oxidizer combinations are also possible.

In order to accomplish a simultaneous charging and collection of exhaust particles 2104, electrodes 2106 may be placed at either side of a combustion volume 2108 above flame 2101, and charged with a sufficiently high voltage to generate a corona discharge. Voltage may be applied to electrodes 2106 by a high voltage power source (HVPS) 2110.

In order to generate a corona discharge one or both electrodes 2106 is configured to taper to a sharp tip, which can produce a projection of ions near the end of this tip when excited by voltages above a minimum ionization limit. Corona discharge is a process by which a current flows from one electrode 2106 with a high voltage potential into a zone of neutral atmospheric gas molecules such as is present in the combustion exhaust gases 2103 adjacent to the tips of electrodes 2106. These neutral molecules can be ionized to create a region of plasma around electrode 2106. Ions generated in this manner may eventually pass charge to nearby areas of lower voltage potential, such as at collector plate 2102, or they can recombine to again form neutral gas molecules.

When the voltage potential gradient, or electric field, is large enough at a point in the area where a corona discharge is established, neutral air molecules may be ionized and the area may become conductive. The air around a sharp shaped electrode 2106 may include a much higher voltage potential gradient than elsewhere in the area of neutral air molecules. As such, air near electrodes 2106 may become ionized, while air in more distant areas may not. When the air near the tips of sharp shaped electrodes 2106 becomes conductive, it may have the effect of increasing the apparent size of the conductor. Since the new conductive region may be less sharp, the ionization may not extend past this local area.

Outside this area of ionization and conductivity, positively charged air molecules may move in the direction of an oppositely charged object such as collector plate 2102, where they may be neutralized and/or collected.

The movement of these ions generated by a corona discharge, therefore, may form an ionic wind 2114. When exhaust particles 2104 pass through ionic wind 2114, ions may be attached to some or all of exhaust particles 2104 such that particles 2104 become positively charged to provide charged particles 2112.

When the geometry and voltage potential gradient applied to a first conductor increase such that the ionized area continues to grow until it can reach another conductor at a lower potential, a low resistance conductive path between the two conductors may be formed, resulting in an electric arc.

Corona discharge, therefore, may be generally formed at the highly curved regions on electrodes 2106, such as, for example, at sharp corners, projecting points, edges of metal surfaces, or small diameter wires. This high curvature may cause a high voltage potential gradient at these locations on electrodes 2106 so that the surrounding air breaks down to form a plasma. The electrodes 2106 are preferably driven to a voltage sufficiently high to eject ions, but sufficiently low to avoid causing dielectric breakdown and associated plasma formation. The corona discharge may be either positively or negatively charged depending on the polarity of the voltage applied to electrodes 2106. If electrodes 2106 are positive with respect to collector plate 2102, the corona discharge will be positive and vice versa. Typically charges of either sign are deposited on molecules and/or directly onto larger particulates. Charges deposited onto molecules tend to transfer to larger particles (e.g. onto particles including carbon chains with a relatively large number of carbon atoms). Particles including carbon chains essentially constitute unburned fuel. It is desirable to recycle carbon into the combustion reaction to achieve more complete combustion.

Moreover, charges tend to collect on metals and metal-containing particulates including mercury, arsenic, and/or selenium. According to embodiments, structures and functions disclosed herein are arranged to remove metal cations from flue gas.

In some embodiments, ions in ionic wind 2114 can have a constant positive polarity. Positively charged particles 2112 may be attracted by collector plate 2102 which may be negatively charged. Particles 2104 which are larger may obtain more charge due to a larger area exposed to receive more positive ions, for example. Charged particles 2112 sized between about 0.1 µm and about 10 µm may be more easily attracted and collected by collector plate 2102, while charged particles 2112 with size smaller than about 0.1 µm can exit combustion system 2100 without being attracted by collector plate 2102. Re-entrainment of charged particles 2112 larger than 10 µm into combustion volume 2108 or disposal within a suitable storage component of combustion system 2100 (not shown) may reduce exhaust emissions, including but not limited to soot and unburned fuel that may be contained within particles 2104.

In other embodiments, ions in ionic wind 2114 can have a negative polarity.

In still other embodiments, charging the combustion reaction can be omitted. A collector plate 2102 or director conduit 202 (see FIG. 29) can attract charged particles such as metal cations from the flue gas.

Other charging methods can, for example, include utilizing fluxes of x-rays or laser beams, radiation material enrichment-like processes, and various electrical discharge processes. The application of an electric field by a corona discharge generated by an application of high voltage at electrodes 2106 may be controlled by a combustion control system.

According to another embodiment, the collector plate 2102 may include an electrical conductor coupled to receive a second polarity electrical potential from a node (not shown) operatively coupled to the HVPS 2110. The collector plate 2102 may be disposed above and away from the combustion volume 2108 distal to the flame 2101, arranged to cause at least one particle classification to flow to a collection location and to cause at least one different particle classification to flow to one or more locations different from the collection location. The main particle flow may typically be aerodynamic. The differentiation between the collected particles and uncollected particles may be based at least partly on the response of a characteristic charge-to-mass ratio (Q/m) of the collected particles.

In yet another embodiment, a director conduit may be configured to receive the flow of the selected particle classification at a first collection location and to convey the flow of at the least one particle classification to an output location. The output location may be selected to cause the output flow of the selected particle classification to flow back toward the flame 2101. For example, unburned fuel particles may be relatively heavy, and have a tendency to carry positive charges on their surface. According to yet another embodiment, the described system can recycle the unburned fuel to the flame 2101. For example, this can allow higher flow rates than could normally be sustained with high combustion efficiency.

Figure 29:
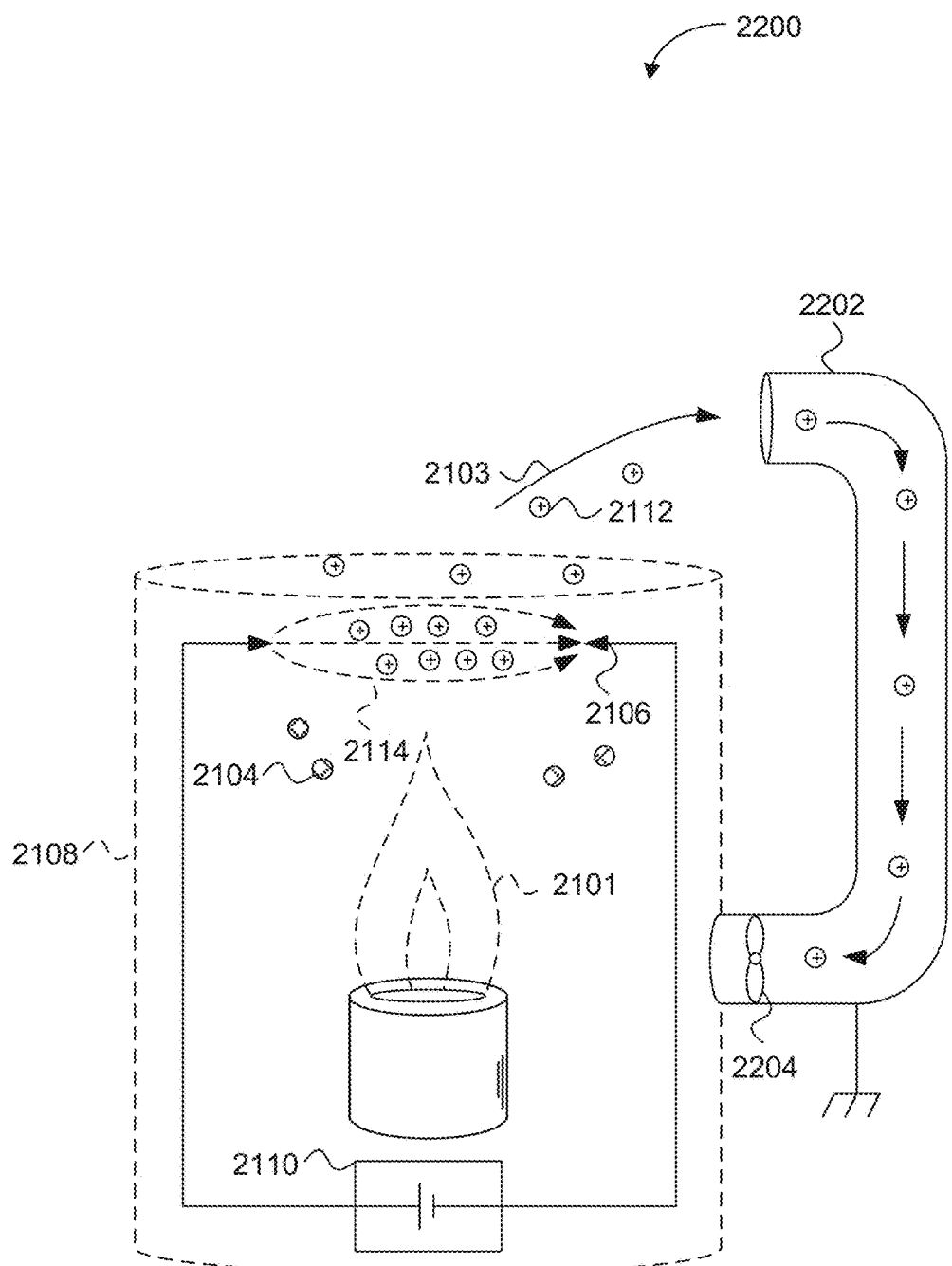
FIG. 29 shows an embodiment of a combustion system employing a corona discharge structure and a director conduit, according to an embodiment.

FIG. 29 shows an embodiment of a combustion system 2200 employing a corona discharge device, as described in FIG. 28, and the director conduit 2202. Particles 2104 charged by ionic wind 2114 generated by a corona discharge created by the application of a high voltage to electrodes 2106, provide charged particles 2112, in an embodiment. Charged particles 2112 may exit combustion volume 2108 and may be attracted to director conduit 202 which may be polarized or grounded such that director conduit 202 may be negatively charged with respect to positively charged particles 2112. A fan or impeller 204 may be placed inside director conduit 202 to provide additional dragging force to attract charged particles 2112 back into combustion volume 2108 where charged particles 2112 may be re-burned or disposed of into a suitable storage location (not shown) in combustion system 2200. As described in FIG. 28, larger particles 2104 may obtain more charge than smaller particles 2104, therefore, particles 2104 of a size raging from about 0.1 µm to about 10 µm may be more easily attracted to director conduit 2202. After re-burning, charged particles 2112 may be consumed or may be agglomerated to a size larger than about 0.1 µm, and thus may exit combustion system 2200 without being attracted by director conduit 2202. Fan or impeller 2204 may generate a vacuum pressure selected to reduce sedimentation of charged particles 2112 in director conduit 2202. Suitable materials for director conduit 2202 may include a variety of insulated and/or dielectric materials such as elastomeric foam, fiberglass, ceramics, refractory brick, alumina, quartz, fused glass, silica, VYCOR™, and the like.

Figure 30:
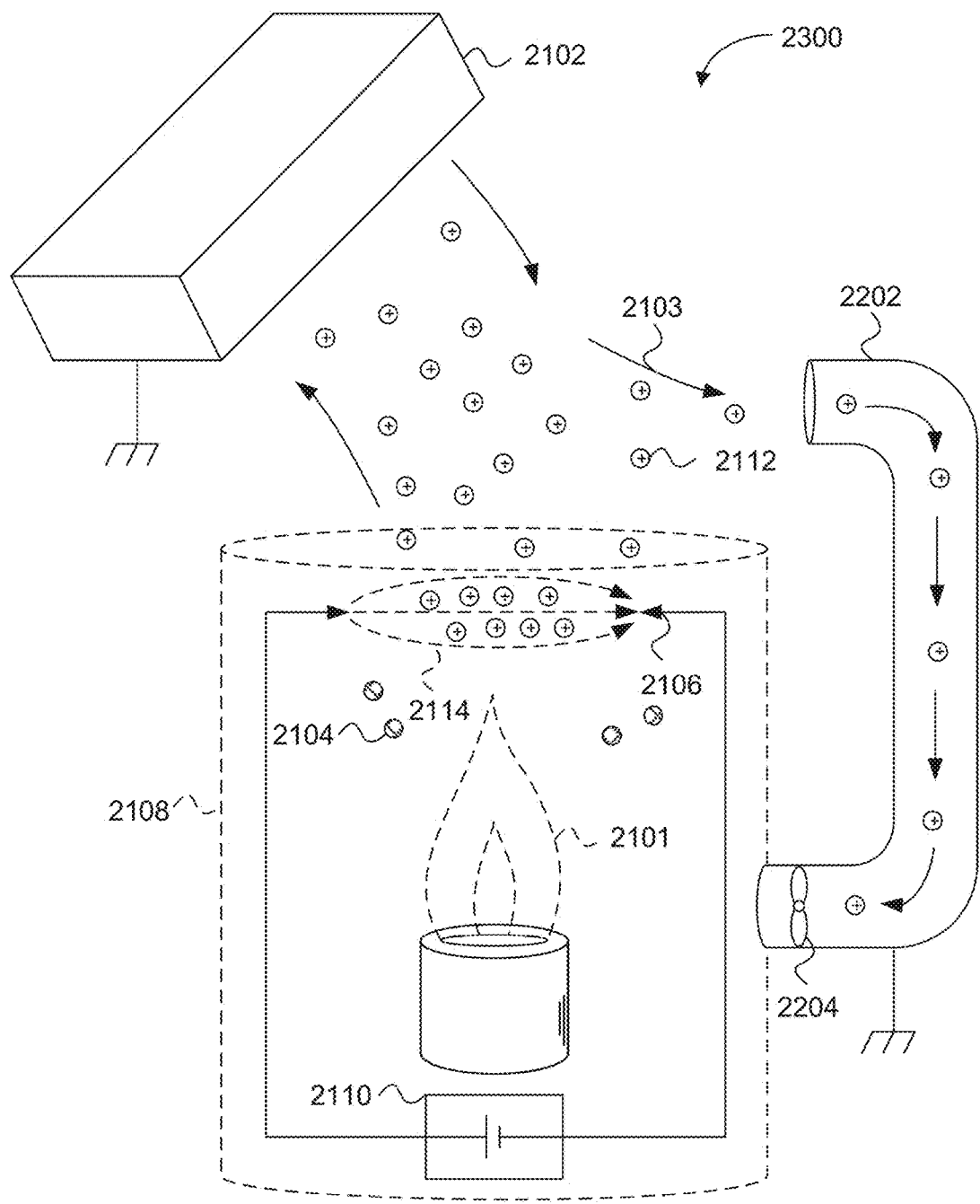
FIG. 30 illustrates an embodiment of combustion system employing a corona discharge structure, a director conduit and a collector plate, according to an embodiment.

In still another embodiment, FIG. 30 illustrates a combustion system 2300 employing a corona discharge device and a collector plate 2102, as described in FIG. 28, and a director conduit 202, as described in FIG. 29. Particles 2104 may again be charged by ionic wind 2114 generated by a corona discharge created by the application of a high voltage to electrodes 2106 to provide charge particles 2112. The charged particles 2112 may exit combustion volume 2108 and may be attracted to director conduit 2202 which may be polarized or grounded such that director conduit 2202 may be negatively charged with respect to positively charged particles 2112. As before, director conduit 2202 may include an inlet port disposed above the combustion volume, an outlet port disposed adjacent to the flame, a tubular body between the inlet and outlet ports. Fan or impeller 2204 may be placed inside director conduit 202 to provide additional dragging force to draw charged particles 2112 back into combustion volume 2108 where charged particles 2112 may be re-burned. Fan or impeller 2204 may also generate a vacuum pressure which may reduce sedimentation of charged particles 2112 in director conduit 2202. Suitable materials for director conduit 2202 may again include insulated and dielectric materials such as elastomeric foam, fiberglass, ceramics, refractory brick, alumina, quartz, fused glass, silica, VYCOR™, and the like.

Finally, particles 2104 in exhaust gases that are recirculated trough flame 2101 and re-burned may be charged again during another cycle of corona discharge application and may be collected by collector plate 2102 for later disposal according to established methods for exhaust gas emissions.

Figure 31:
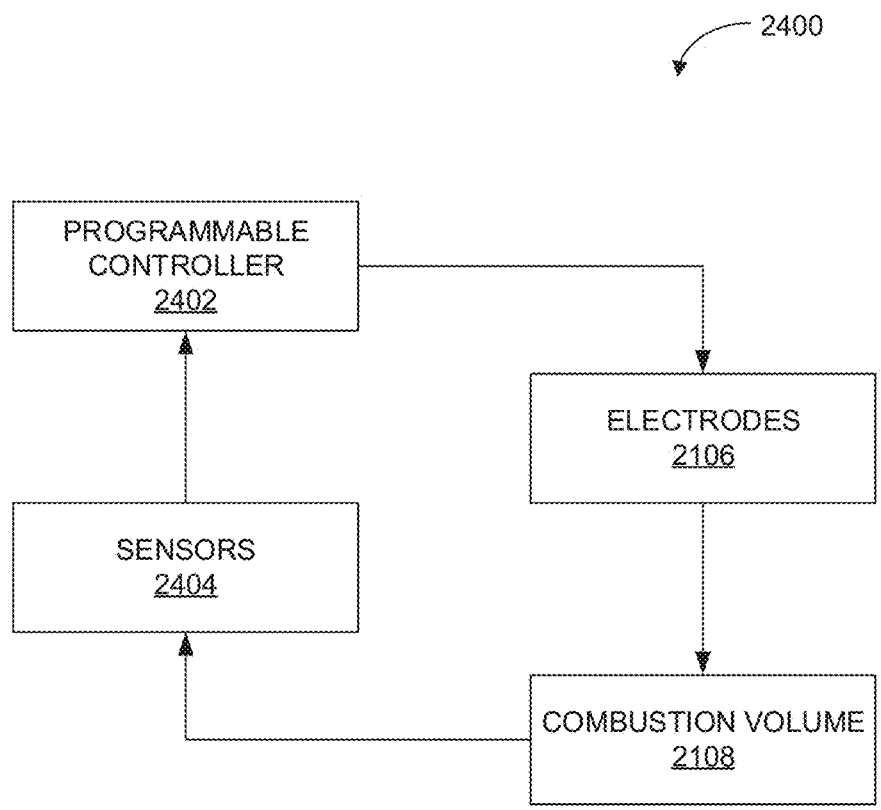
FIG. 31 shows a block diagram of a combustion control system, according to an embodiment.

FIG. 31 is a block diagram of combustion control system 2400 that may be integrated in combustion systems 2100, 2200, and 2300, according to an embodiment. Programmable controller 2402 may determine and control the necessary electric field for the generation of a corona discharge from HVPS 2110 to apply suitable voltages to electrodes 2106 based on information received from sensors 2404. Sensors 2404 may be placed inside combustion volume 2108 to send feedback to programmable controller 2402 to determine the voltage potential gradient required to establish the corona discharge. Combustion control system 2400 may include a plurality of sensors 2404 such as combustion sensors, temperature sensors, spectroscopic and opacity sensors, and the like. The sensors 2404 may also detect combustion parameters such as, for example, a fuel particle flow rate, stack gas temperature, stack gas optical density, combustion volume temperature and pressure, luminosity and levels of acoustic emissions, combustion volume ionization, ionization near one or more electrodes 2106, combustion volume maintenance lockout, and electrical fault, amongst others. The information (sensor output data) provided by the plurality of sensors 2404 may be typically in the form of continuous, discrete voltage output data (e.g., ±5V, ±12V) several times a second which is compared against predetermined (preprogrammed) values, in real time, within programmable controller 402.

Figure 32:
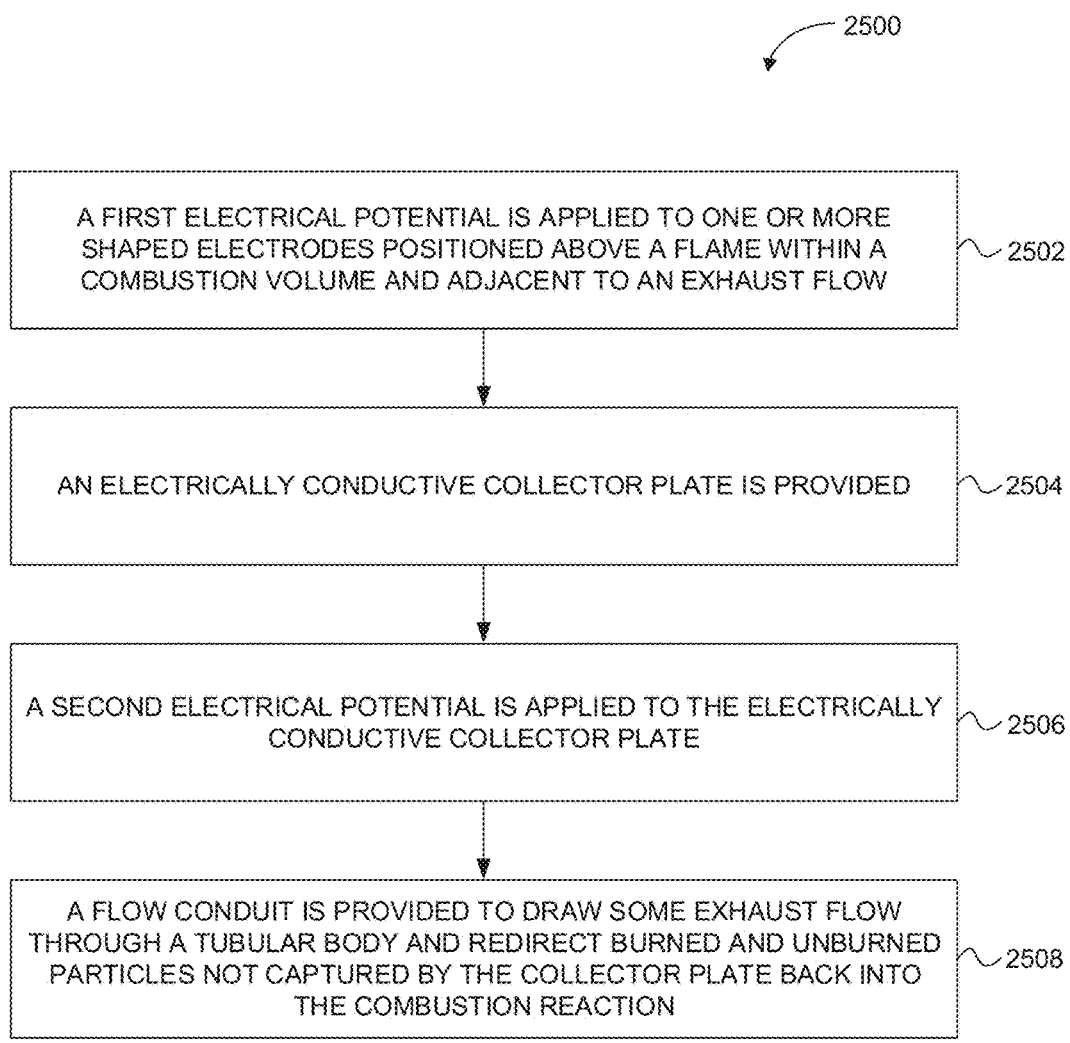
FIG. 32 is a flow chart of a method for reducing the size and/or amount of exhaust particles entrained within a flue gas leaving a combustion system, according to an embodiment.

FIG. 32 is a flow chart of a method 2500 for reducing the size and number of particles entrained within an exhaust flow leaving a combustion system, according to an embodiment. The method 2500 includes step 2502, a first electrical potential is applied to one or more shaped electrodes positioned above a flame within a combustion volume and adjacent to an exhaust flow including a plurality of burned and unburned particles leaving the combustion volume. The one or more shaped electrodes may be tapered to a sharp tip directed into the exhaust flow. The applied electrical potential may generate a corona discharged proximate to the sharp tip of each of the one or more shaped electrodes. The corona discharge may generate an ionic wind passing through the exhaust flow. A portion of the plurality of burned and unburned particles may acquire an electric charge having a first polarity.

In step 2504 an electrically conductive collector plate is provided. The collector plate may be disposed above and away from the combustion volume distal to the flame.

In step 2506, a second electrical potential is applied to the electrically conductive collector plate. The second electrical potential may have a polarity opposite that of the first polarity, wherein some fraction of the plurality of the charged particles may be collected at a surface of the collector plate.

In step 2508, a "flow" or director conduit is provided. The director conduit may include an inlet port disposed above the combustion volume, an outlet port disposed adjacent to the flame, a tubular body between the inlet and outlet ports, and a fan, impeller or vacuum means for drawing some portion of the exhaust flows through the tubular body thereby redirecting some portion of the burned and unburned particles not captured by the collector plate back into the combustion volume.

According to an embodiment, a combustion system 2100 may include a combustion volume 2108 configured to support a flow stream including a mixture of fuel and oxidizer ignited within the combustion volume 2108 to generate a flame 2101 and an exhaust flow 2103 having a plurality of combustion particle classifications; and a charge source configured to supply electrical charges into the exhaust flow. Additionally, it may include a high voltage power supply (HVPS) 2110 configured to apply an electrical potential having a first polarity to the charge source; and a collector plate 2102 including an electrical conductor coupled to receive an electrical potential having a second polarity from a node operatively coupled to the HVPS 2110.

The collector plate 2102 may be disposed above and away from the combustion volume 2108 distal to the flame 2101 and arranged to cause at least one combustion particle classification to flow to a collection location and to cause at least one different combustion particle classification to flow to one or more locations different from the collection location. The charge source may include one or more shaped electrodes 2106.

In an embodiment, the one or more shaped electrodes 2106 may be positioned within the combustion volume 2108 above and to a side of the flame 2101 and adjacent to the exhaust flow 2103. Additionally, the one or more shaped electrodes 2106 may be tapered to a sharp tip directed into the exhaust flow 2103. In an embodiment, the one or more shaped electrodes 2106 may generate a corona discharge proximate to the sharp tip. The corona discharge may, in turn, generate an ionic wind 2114 passing through the exhaust flow 2103. The ionic wind 2114 may be partly responsible for causing the at least one combustion particle classification to flow to the collection location. The corona discharge may be selected to cause a charge to attach to all or most of the plurality of combustion particle classifications.

In an embodiment, the collector plate 2102 may include an electrically conductive surface proximate to the exhaust flow 2103. The electrically conductive surface may include a metal, such as iron, steel, copper, silver or aluminum, or alloys of each, wherein the preponderant constituent of the alloy consists of iron, steel, copper, silver or aluminum.

According to an embodiment, the combustion system may further include a director conduit 2202 configured to receive the flow of the at least one combustion particle classification at the collection location and to convey the flow of at the least one combustion particle classification to an output location. The director conduit 2202 may include an inlet port disposed above the combustion volume 2108 proximate the collection location, an outlet port disposed adjacent the combustion volume 2108 proximate the flame 2101, and a hollow body connecting the inlet and outlet ports. The director conduit 2202 may further include a fan, impeller or vacuum means 2204 to provide an additional dragging force on the first combustion particle classification through the hollow connecting body from the inlet port to the outlet port. The output location may be selected to cause the flow of the at least one combustion particle classification to flow toward the flame 2101. The director conduit 2202 may include a dielectric or insulator material, such as elastomeric foam, fiberglass, ceramics, refractory brick, alumina, quartz, fused glass, silica, VYCOR™, and combination thereof.

According to an embodiment, a combustion system 2200 may include a combustion volume 2108 configured to support a flow stream including a mixture of fuel and oxidizer ignited within the combustion volume 2108 to generate a flame 2101 and an exhaust flow 2103 having a plurality of combustion particle classifications; and a charge source configured to supply electrical charges into the exhaust flow. The combustion system may further include a high voltage power supply (HVPS) 2110 configured to apply an electrical potential having a first polarity to the charge source, and a director conduit 2202 configured to receive a flow of at least some portion of the plurality of combustion particle classifications at a collection location and convey the flow of at the least some portion of the plurality of combustion particle classifications to an output location.

The charge source may include one or more shaped electrodes 2106, which may be positioned above and to a side of the flame 2101 and adjacent to the exhaust flow 2103. The one or more shaped electrodes 2106 are tapered to a sharp tip directed into the exhaust flow 2103. The one or more shaped electrodes 2106 may be configured to generate a corona discharge proximate to the sharp tip. The corona discharge may, in turn, generate an ionic wind 2114 passing through the exhaust flow 2103. The ionic wind 2114 may be partly responsible for causing at least some portion of the plurality of combustion particle classifications to flow to the collection location. The corona discharge may be selected to cause a charge to attach on to all or most of the plurality of combustion particle classifications.

According to an embodiment, the director conduit 2202 may include an inlet port disposed above the combustion volume 2108 proximate the collection location, an outlet port disposed adjacent the combustion volume 2108 proximate the flame 2101, and a hollow body connecting the inlet and outlet ports. The director conduit 2202 may further include a fan, impeller or vacuum means 2204 to provide an additional dragging force on the first combustion particle classification through the hollow connecting body from the inlet port to the outlet port. In an embodiment, the output location may be selected to cause the flow of the at least one combustion particle classification to flow toward the flame 2101. The director conduit 2202 may include a dielectric or insulator material, such as elastomeric foam, fiberglass, ceramics, refractory brick, alumina, quartz, fused glass, silica, VYCOR™, and combination thereof.

According to an embodiment, a combustion system may further include one or more sensors 2404 in electrical communication with a programmable controller 2402. The one or more sensors 2404 may each provide a plurality of time-sequenced sensor inputs to the programmable controller. The programmable controller may be configured to change the electrical potential applied by the HVPS 2110 to the one or more shaped electrodes 2106 from time-to-time based on a comparison of the plurality of time-sequenced sensor inputs received by the programmable controller 2402 against a set of one or more predetermined values preprogrammed onto the programmable controller 2402.

According to an embodiment, a method for reducing the size and number of particles entrained within an exhaust flow leaving a combustion system may include applying a first electrical potential to one or more shaped electrodes positioned above a flame within a combustion volume and adjacent to the exhaust flow an exhaust flow including a plurality of burned and unburned particles leaving the combustion volume. A corona discharge may be generated proximate to the shaped electrodes, thereby providing an ionic wind including a plurality of electric charges passing through the exhaust flow. In an embodiment, at least some of the electric charge having a first polarity may be deposited onto at least a portion of the plurality of burned and unburned particles thereby providing a plurality of charged particles.

According to an embodiment, an electrically conductive collector plate may be provided. The collector plate may be disposed above and away from the combustion volume distal to the flame.

According to an embodiment, a second electrical potential may be applied to the electrically conductive collector plate, the second electrical potential having a polarity which is opposite that of the first polarity, wherein at least a fraction of the plurality of charged particles is collected at a surface of the collector plate.

According to an embodiment, generating a corona discharge proximate to the shaped electrodes may include providing shaped electrodes that are tapered to a sharp tip. Generatin a corona discharge proximate to the shaped electrodes may further include generating a high voltage potential proximate to the sharp tip. The ionic wind may be partly responsible for causing the fraction of the plurality of the charged particles to flow to the surface of the collector plate. The collector plate may include an electrically conductive surface proximate to the exhaust flow. In an embodiment, the electrically conductive surface may include a metal, such as iron, steel, copper, silver or aluminum, or alloys of each, wherein the preponderant constituent of the alloy consists of iron, steel, copper, silver or aluminum.

According to an embodiment, the method further include providing a director conduit configured to receive a flow of some portion of the plurality of burned and unburned particles at an input location and to convey the flow to an output location. The director conduit may include an inlet port disposed above the combustion volume proximate the input location disposed away from the collection plate, an outlet port disposed adjacent the combustion volume proximate the flame, and a hollow body connecting the inlet and outlet ports. The director conduit may further include a fan, impeller or vacuum means to provide an additional dragging force on at least some of the plurality of burned and unburned particles through the hollow connecting body from the inlet port to the outlet port. The output location may be selected to cause the flow of the at least some of the plurality of burned and unburned particles to flow toward the flame. In an embodiment, the director conduit may include a dielectric or insulator material, such as elastomeric foam, fiberglass, ceramics, refractory brick, alumina, quartz, fused glass, silica, VYCOR™, and combination thereof.

According to an embodiment, the method may further include providing a director conduit having an inlet port disposed above the combustion volume, an outlet port disposed adjacent to the flame, a tubular body between the inlet and outlet ports, and a fan, impeller or vacuum means for drawing some portion of the exhaust flows through the tubular body thereby redirecting some portion of the burned and unburned particles not captured by the collector plate back into the combustion volume. The method may further include providing one or more sensors in electrical communication with a programmable controller. The one or more sensors may each be providing a plurality of time-sequenced sensor inputs to the programmable controller. The programmable controller may change the electrical potential applied by the HVPS to the one or more shaped electrodes from time-to-time based on a comparison of the plurality of time-sequenced sensor inputs received by the programmable controller against a set of one or more predetermined values preprogrammed onto the programmable controller. The various systems, apparatuses, burners, devices, processes, and methods disclosed in FIGS. 1-32 can be combined to provide other embodiments. As an example, the combustion apparatuses 100 and 200 of FIG. 1 and FIG. 2 can implement the electrodes 2106, the collector 2102, and the voltage source 2110 and other components of FIGS. 28-31 in order to remove collect, trap, draw away, and/or remove portions of an exhaust or flue gas from the combustion reaction 150 and/or the combustion reaction 115. For example, the electrodes 2106, can be positioned above the second combustion reaction 150 of FIG. 1 in order to inject charged particles into an exhaust stream or flue gas stream. The collector 2102 can be positioned above and lateral from the combustion reaction 150 and can act as a field electrode to attract exhaust or flue gas particles. The conduit 2202 can also be positioned to act as a field electrode to attract exhaust particles from the second combustion reaction 150.

With reference to FIGS. 1-3, 28-32, according to an embodiment, a method for operating a combustion system, includes outputting a first fuel and a first oxidant, supporting a first combustion reaction 115 with the first fuel and first oxidant, supporting a second combustion reaction 150 of the heated second fuel to the produce a flue gas including entrained particles. The method further includes providing an electrical charge to the second combustion reaction 150, wherein the electrical charge is carried by the entrained particles, supporting a first field electrode, such as the collector 102, adjacent to a main flow of the flue gas and applying a first voltage to the first field electrode. The method also includes electrostatically attracting the entrained particles toward the first field electrode to remove at least a portion of the entrained particles from a main flow of the flue gas. According to an embodiment the first voltage is opposite in polarity to the electrical charge provided to the second combustion reaction 150. According to an embodiment, providing the electrical charge to the second combustion reaction 150 includes applying a voltage to a grate 135 supporting the second fuel 145 and transferring charges from the grate 135 to the second fuel 145. According to an embodiment, the grate includes a crucible. According to an embodiment, providing the electrical charge to the second combustion reaction 150 includes operating an ionizer, for example including electrodes 106, to apply charges to the first combustion reaction 150. According to an embodiment, the method includes outputting a second oxidant proximal to the second fuel. According to an embodiment providing the electrical charge to the second combustion reaction includes operating an ionizer 2106 to apply charges to the second oxidant. According to an embodiment, the method includes According to an embodiment the method includes providing a second field electrode, for example the director conduit 2202, disposed in juxtaposition to the first field electrode and applying a second voltage different than the first voltage to the second field electrode to form an electric field between the first and second field electrodes. According to an embodiment, the first field electrode includes a plurality of conductors disposed across the main flow of the flue gas and wherein the second field electrode includes a plurality of conductors interlineated with the first electrode plurality of conductors.

According to an embodiment, the second voltage is opposite in polarity to the first voltage. According to an embodiment, the method includes providing a secondary flue gas flow different than the first flue gas flow adjacent to the first field electrode, and entraining the electrostatically attracted particles in the secondary flue gas flow. The method can further include directing the secondary flue gas flow and entrained electrostatically attracted particles toward the first or second combustion reaction 115, 150. Removing the entrained electrostatically attracted particles from the secondary flue gas flow can include filtering the secondary flue gas flow.

With reference to FIGS. 1-3, 28-32 a co-fired combustion apparatus includes a first fuel-introduction body 105 configured to provide a first fuel to a first combustion reaction 115 and a second fuel-introduction body 135 configured to provide a second fuel to a second combustion reaction 150, wherein the second combustion reaction emits an exhaust flow having a plurality of combustion particle classifications and wherein the first fuel introduction body 105 is positioned relative to the second fuel introduction body 135 to cause the first combustion reaction to at least intermittently provide heat to the second combustion reaction 150. The apparatus further includes an electrode assembly 160 associated with the second fuel introduction body 135 or a second combustion volume to which the second fuel introduction body 135 provides the second fuel, the electrode assembly 160 being configured to be driven to or maintained at one or more first voltages selected to provide an electric field to the second combustion volume. The apparatus further includes a charge source, for example electrodes 2106, configured to supply electrical charges into the exhaust flow and a high voltage power supply 2110 (HVPS) configured to apply an electrical potential having a first polarity to the charge source. The apparatus further includes a collector plate 2102 including an electrical conductor coupled to receive an electrical potential having a second polarity from a node operatively coupled to the HVPS, the collector plate 102 disposed above and a distal to the second combustion reaction 150 and arranged to cause at least one combustion particle classification to flow to a collection location and to cause at least one different combustion particle classification to flow to one or more locations different from the collection location.

According to an embodiment, the electrode assembly includes one or more electrodes proximate or within the second combustion region. According to an embodiment, the electrode assembly 160 includes the second fuel-introduction body 145.

According to an embodiment, a portion of the apparatus is enclosed within a housing 120. According to an embodiment, a portion of the housing 120 is operable to be driven to or held at one or more second voltages. According to an embodiment, the electrode assembly 160 includes a portion of the housing 120.

According to an embodiment, the second fuel-introduction body 135 includes a crucible assembly configured to support the second fuel. The electrode assembly 160 may include the crucible assembly.

According to an embodiment, the first fuel-introduction body 105 includes a burner assembly. The first fuel-introduction body 105 may be configured to be driven to or held at one or more second voltages.

According to an embodiment, the electrode assembly 160 associated with the second combustion region is operable to increase combustion efficiency of the second combustion reaction 150 when the electrode assembly 160 is driven to or held at the one or more first voltages.

According to an embodiment, the second combustion reaction 150 produces a combustion product stream having a flow and the electrode assembly associated with the second combustion region is operable to generate a combustion product stream flow having turbulent flow when the electrode assembly 160 is driven to or held at the one or more first voltages.

According to an embodiment, the first fuel is substantially liquid or gaseous. According to an embodiment, the second fuel is substantially solid. According to an embodiment, the second fuel forms a portion of a fluidized bed.

According to an embodiment, the apparatus includes a stoker configured to introduce the second fuel to the second combustion region.

According to an embodiment, a portion of the apparatus is enclosed within a flue, stack, or pipe configured to convey a combustion product stream generated by at least the second combustion.

According to an embodiment, the first fuel includes at least one of natural gas, propane, butane, coal, or oil. According to an embodiment, the second fuel includes one or more of rubber, wood, glycerin, an industrial waste stream, a post-consumer waste stream, an industrial by-product, garbage, hazardous waste, human waste, animal waste, animal carcasses, forestry residue, batteries, tires, waste plant material, or landfill waste.

According to an embodiment, the co-fired combustion apparatus further includes a first burner assembly configured to support the first combustion and a burner support configured to support the first burner assembly in a housing.

According to an embodiment, the charge source includes one or more shaped electrodes 2106. According to an embodiment, the one or more shaped electrodes 2106 are positioned within the combustion volume above and to a side of the second combustion reaction 150 and adjacent to the exhaust flow. According to an embodiment, the one or more shaped electrodes 106 are tapered to a sharp tip directed into the exhaust flow. The one or more shaped electrodes may generate a corona discharge proximate to the sharp tip. The corona discharge may generate an ionic wind 2114 passing through the exhaust flow.

According to an embodiment, the ionic wind 2114 is partly responsible for causing the at least one combustion particle classification to flow to the collection location 2102. According to an embodiment, the corona discharge is selected to cause a charge to attach to all or most of the plurality of combustion particle classifications.

According to an embodiment, the collector plate 2102 includes an electrically conductive surface proximate to the exhaust flow. The electrically conductive surface may include a metal. According to an embodiment, the metal is iron, steel, copper, silver or aluminum, or alloys of each, wherein the preponderant constituent of the alloy consists of iron, steel, copper, silver or aluminum.

According to an embodiment, the co-fired apparatus includes a director conduit 2202 configured to receive the flow of the at least one combustion particle classification at the collection location and to convey the flow of at the least one combustion particle classification to an output location. The director conduit 2202 may include an inlet port disposed above the combustion volume proximate the collection location, an outlet port disposed adjacent the combustion volume proximate the flame, and a hollow body connecting the inlet and outlet ports.

According to an embodiment, the director conduit 2202 further includes a fan 2204, impeller or vacuum means to provide an additional dragging force on the first combustion particle classification through the hollow connecting body from the inlet port to the outlet port. According to an embodiment, the output location is selected to cause the flow of the at least one combustion particle classification to flow toward the flame. The director conduit 2202 includes a dielectric or insulator material. According to an embodiment, the dielectric or insulator material is selected from the list consisting of elastomeric foam, fiberglass, ceramics, refractory brick, alumina, quartz, fused glass, silica, VYCOR™, and combination thereof.

Finally, while various aspects and embodiments have been disclosed herein, other aspects and embodiments are contemplated. The various aspects and embodiments disclosed herein are for purposes of illustration and are not intended to be limiting, with the true scope and spirit being indicated by the following claims.

While various aspects and embodiments have been disclosed herein, other aspects and embodiments are contemplated. The various aspects and embodiments disclosed herein are for purposes of illustration and are not intended to be limiting, with the true scope and spirit being indicated by the claims.

What is claimed is:

1. A method for operating a combustion system, comprising:
   outputting a first fuel and a first oxidant;
   supporting a first combustion reaction with the first fuel and first oxidant;
   supporting a second combustion reaction of a heated second fuel to produce a flue gas including entrained particles;
   providing an electrical charge to the second combustion reaction, wherein the electrical charge is carried by the entrained particles;
   supporting a first field electrode adjacent to a main flow of the flue gas;
   applying a first voltage to the first field electrode; and
   electrostatically attracting the entrained particles toward the first field electrode to remove at least a portion of the entrained particles from a main flow of the flue gas.

2. The method of claim 1, wherein the first voltage is opposite in polarity to the electrical charge provided to the second combustion reaction.

3. The method of claim 1, wherein providing the electrical charge to the second combustion reaction includes applying a voltage to a grate supporting the second fuel and transferring charges from the grate to the second fuel.

4. The method of claim 3, wherein the grate comprises a crucible.

5. The method of claim 1, wherein providing the electrical charge to the second combustion reaction includes operating an ionizer to apply charges to the first combustion reaction.

6. The method of claim 1, further comprising: outputting a second oxidant proximal to the second fuel.

7. The method of claim 6, wherein providing the electrical charge to the second combustion reaction includes operating an ionizer to apply charges to the second oxidant.

8. The method of claim 1, further comprising:
providing a second field electrode disposed in juxtaposition to the first field electrode; and
applying a second voltage different than the first voltage to the second field electrode to form an electric field between the first and second field electrodes.

9. The method of claim 8, wherein the first field electrode comprises a plurality of conductors disposed across the main flow of the flue gas; and wherein the second field electrode comprises a plurality of conductors interlineated with the first electrode plurality of conductors.

10. The method of claim 8, wherein the second voltage is opposite in polarity to the first voltage.

11. The method of claim 1, further comprising:
providing a secondary flue gas flow different than the main flow of the flue gas adjacent to the first field electrode; and
entraining the electrostatically attracted particles in the secondary flue gas flow.

12. The method of claim 11, further comprising: directing the secondary flue gas flow and entrained electrostatically attracted particles toward the first or second combustion reaction.

13. The method of claim 11, further comprising removing the entrained electrostatically attracted particles from the secondary flue gas flow by filtering the secondary flue gas flow.

\* \* \* \* \*